(12) United States Patent
Oba et al.

(10) Patent No.: US 7,977,559 B2
(45) Date of Patent: Jul. 12, 2011

(54) TONE GENERATION SYSTEM CONTROLLING THE MUSIC SYSTEM

(75) Inventors: Hiroyuki Oba, Hamamatsu (JP); Shuzo Karakawa, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 12/913,665

(22) Filed: Oct. 27, 2010

(65) Prior Publication Data

US 2011/0040880 A1    Feb. 17, 2011

Related U.S. Application Data

(62) Division of application No. 11/582,493, filed on Oct. 16, 2006, now Pat. No. 7,847,174.

(30) Foreign Application Priority Data

| Oct. 19, 2005 | (JP) | 2005-304030 |
| Oct. 19, 2005 | (JP) | 2005-304031 |
| Oct. 19, 2005 | (JP) | 2005-304032 |
| Oct. 19, 2005 | (JP) | 2005-304033 |

(51) Int. Cl.
*G10H 1/00* (2006.01)

(52) U.S. Cl. .................. 84/600; 84/601; 84/602
(58) Field of Classification Search ............. 84/600–602
See application file for complete search history.

(56) References Cited

U.S. PATENT DOCUMENTS

| 5,734,119 A | 3/1998 | France et al. |
| 5,825,752 A | 10/1998 | Fujimori et al. |
| 5,861,567 A | 1/1999 | Hirano |
| 6,153,820 A | 11/2000 | Fujimori et al. |
| 6,351,771 B1 * | 2/2002 | Craddock et al. ............. 709/227 |
| 6,686,530 B2 | 2/2004 | Juszkiewicz et al. |
| 6,696,631 B2 | 2/2004 | Smith et al. |
| 6,700,050 B2 | 3/2004 | Sakurada et al. |

(Continued)

FOREIGN PATENT DOCUMENTS

EP    1 117 226    7/2001

(Continued)

OTHER PUBLICATIONS

European Search Report mailed on May 26, 2008, for EP Application No. 08103495.1, eight pages.

(Continued)

*Primary Examiner* — David S. Warren
(74) *Attorney, Agent, or Firm* — Morrison & Foerster LLP

(57) ABSTRACT

In a plurality of rooms, hubs are installed to build a star-shaped LAN, and tone-generation-related devices, such as a keyboard, tone generator device and speaker, are connected to the respective hubs. For example, in an internal network, the keyboard is logically connected to an input side of the tone generator device and a speaker is connected to an output side of the tone generator device, so as to build a tone generation system. The tone-generation-related devices are provided with respective network adaptors so that they can be readily connected to the LAN. Communication is carried out between the tone-generation-related devices, using a communication protocol intended for retransmission control. Each of the tone-generation-related devices is in the form of a processor device, which executes a program corresponding to a function of a desired processing element to thereby implement the desired processing element. Once a given tone-generation-related device, implementing a plurality of processing elements, is connected to the network, an internal connection between the processing elements is canceled.

3 Claims, 16 Drawing Sheets

U.S. PATENT DOCUMENTS

| | | | |
|---|---|---|---|
| 6,714,518 B1* | 3/2004 | Weis | 370/248 |
| 6,725,303 B1* | 4/2004 | Hoguta et al. | 710/106 |
| 6,737,571 B2 | 5/2004 | Furukawa | |
| 6,804,209 B1* | 10/2004 | Sugaya et al. | 370/328 |
| 6,822,153 B2 | 11/2004 | Comair et al. | |
| 6,835,884 B2* | 12/2004 | Iwamoto et al. | 84/609 |
| 6,969,797 B2 | 11/2005 | Brinkman et al. | |
| 6,976,867 B2* | 12/2005 | Navarro et al. | 439/489 |
| 7,041,893 B2* | 5/2006 | Hasegawa et al. | 84/609 |
| 7,050,423 B2* | 5/2006 | Schneider et al. | 370/352 |
| 7,089,333 B2 | 8/2006 | Marinescu et al. | |
| 7,189,911 B2* | 3/2007 | Isozaki | 84/609 |
| 7,224,690 B2 | 5/2007 | Fujimori | |
| 7,348,483 B2 | 3/2008 | Puryear | |
| 7,415,025 B1* | 8/2008 | Venkataraman et al. | 370/395.2 |
| 7,420,112 B2 | 9/2008 | Juszkiewicz et al. | |
| 7,592,531 B2* | 9/2009 | Karakawa et al. | 84/600 |
| 7,646,742 B2 | 1/2010 | Petrovic et al. | |
| 7,685,264 B2* | 3/2010 | Tumsi Dayakar et al. | 709/221 |
| 7,793,010 B2* | 9/2010 | Olson et al. | 710/14 |
| 7,847,174 B2* | 12/2010 | Oba et al. | 84/600 |
| 7,864,046 B2* | 1/2011 | Yarsa et al. | 340/539.13 |
| 7,865,466 B2* | 1/2011 | Amies et al. | 707/616 |
| 7,870,374 B2* | 1/2011 | Cagno et al. | 713/1 |
| 2002/0033090 A1* | 3/2002 | Iwamoto et al. | 84/609 |
| 2003/0000368 A1* | 1/2003 | Isozaki | 84/609 |
| 2003/0172797 A1 | 9/2003 | Juszkiewicz et al. | |
| 2004/0199420 A1* | 10/2004 | Bhakta et al. | 705/14 |
| 2004/0199580 A1* | 10/2004 | Zhakov et al. | 709/204 |
| 2005/0089034 A1* | 4/2005 | Sakata et al. | 370/389 |
| 2005/0117719 A1* | 6/2005 | Hyotani et al. | 379/90.01 |
| 2006/0154642 A1* | 7/2006 | Scannell, Jr. | 455/404.1 |
| 2006/0233117 A1* | 10/2006 | Tomsu et al. | 370/254 |
| 2007/0002858 A1 | 1/2007 | Bichot et al. | |
| 2007/0070182 A1 | 3/2007 | Ryu et al. | |
| 2007/0121623 A1* | 5/2007 | Garcia et al. | 370/389 |
| 2007/0124450 A1* | 5/2007 | Oba et al. | 709/223 |
| 2007/0168046 A1* | 7/2007 | Misawa et al. | 700/1 |
| 2007/0168468 A1* | 7/2007 | Stogel et al. | 709/219 |
| 2007/0168827 A1 | 7/2007 | Lohr et al. | |
| 2007/0185967 A1* | 8/2007 | Hayes, Jr. | 709/208 |
| 2007/0189275 A1 | 8/2007 | Neff | |
| 2007/0214945 A1* | 9/2007 | Karakawa et al. | 84/622 |
| 2008/0101260 A1* | 5/2008 | Maruyama | 370/255 |
| 2008/0275951 A1* | 11/2008 | Hind et al. | 709/204 |
| 2008/0288955 A1* | 11/2008 | Brockway et al. | 719/311 |
| 2009/0052464 A1 | 2/2009 | Gardner et al. | |
| 2009/0063494 A1* | 3/2009 | Amies et al. | 707/10 |
| 2009/0100289 A1* | 4/2009 | Chen et al. | 714/4 |
| 2009/0207810 A1 | 8/2009 | Petrovic et al. | |
| 2009/0313517 A1 | 12/2009 | Schedelbeck et al. | |
| 2010/0046469 A1* | 2/2010 | Kang et al. | 370/331 |
| 2010/0177701 A1 | 7/2010 | Maheshwari et al. | |
| 2010/0185731 A1 | 7/2010 | Wu | |
| 2010/0192198 A1* | 7/2010 | Crick et al. | 726/2 |
| 2010/0235290 A1* | 9/2010 | Junger et al. | 705/304 |
| 2010/0268857 A1* | 10/2010 | Bauman et al. | 710/74 |
| 2010/0325602 A1* | 12/2010 | Kraft et al. | 717/103 |
| 2011/0040880 A1* | 2/2011 | Oba et al. | 709/227 |

FOREIGN PATENT DOCUMENTS

| | | |
|---|---|---|
| EP | 1 404 059 A1 | 3/2004 |
| EP | 1 507 359 | 2/2005 |
| JP | 09-093250 A | 4/1997 |
| JP | 09-281961 A | 10/1997 |
| JP | 09-297579 A | 11/1997 |
| JP | 2002-199046 A | 7/2002 |
| JP | 2003-323173 A | 11/2003 |

OTHER PUBLICATIONS

Notice of Reason(s) for Rejection mailed Jun. 17, 2008, for JP Application No. 2005-304030, with English Translation, four pages.

Notice of Reason(s) for Rejection mailed Jun. 17, 2008, for JP Application No. 2005-304033, with English Translation, four pages.

European Search Report mailed on Feb. 20, 2007, for EP Application No. 06122400.2, 8 pages.

Paul Wiffen, "Mlan's Promise: Audio & MIDI Down the Same Wire", Keyboard, Music Player Network, Feb. 2001, vol. 27, No. 2, pp. 40-42, 44.

* cited by examiner

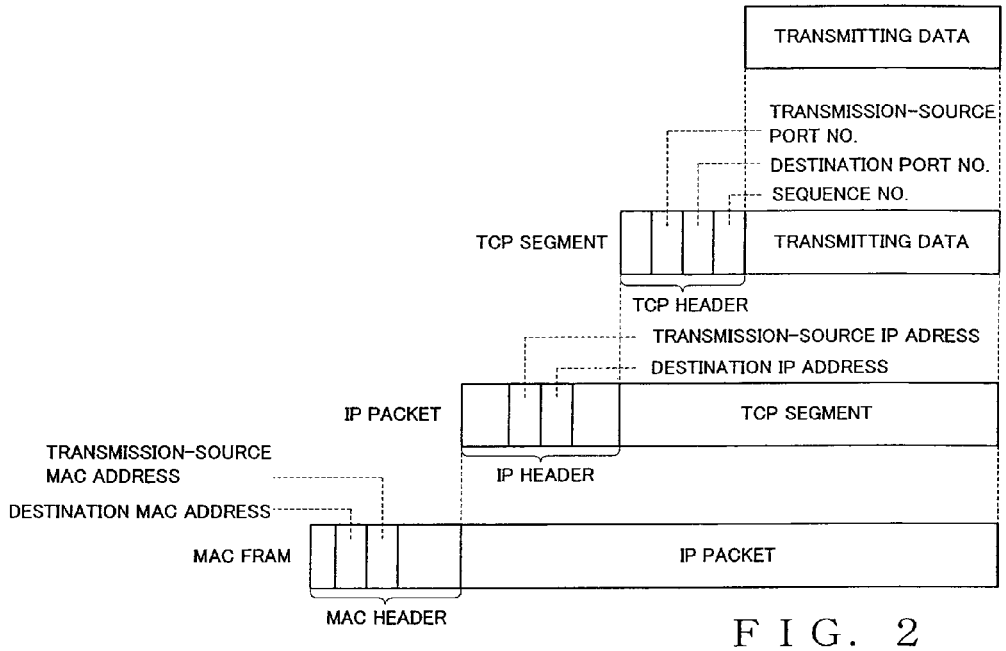

FIG. 2

| LOGICAL DEVICE ID | IP ADDRESS | (PHYSICAL DEVICE ID) | DEVICE NAME | (PROCESSING ID) | PROCESSING ELEMENT NAME |
|---|---|---|---|---|---|
| No.1 | 192.168.111.1 | (01) | SV | (AA) | SERVER |
| No.2 | 192.168.111.2 | (02) | TG1 | (AB) | TONE GENERATOR |
| No.3 | 192.168.111.3 | (03) | TG2 | (AB) | TONE GENERATOR |
| No.4 | 192.168.111.4 | (04) | KB | (AC) | KEYBOARD |
| No.5 | 192.168.111.5 | (05) | SP1 | (AD) | SPEAKER |
| No.6 | 192.168.111.6 | (06) | SP2 | (AD) | SPEAKER |
| No.7 | 192.168.111.7 | (07) | DU | (AE) | DSP UNIT |
|  |  |  |  | (AF) | MIXER |
| No.8 | 192.168.111.8 | (08) | MX | (AF) | MIXER |
| No.9 | 192.168.111.9 | (09) | CR | (AG) | CONTENT RECORDER |
| No.10 | 192.168.111.10 | (10) | AA | (AH) | AUTO. ACCOMPANIMENT |
| No.11 | 192.168.111.11 | (11) | MR | (AI) | MIDI RECORDER |
| No.12 | 192.168.111.12 | (12) | ED | (AJ) | EDITOR |
| No.13 | 192.168.111.13 | (13) | EF | (AK) | EFFECTOR |
| No.14 | 192.168.111.14 | (14) | AR | (AL) | AUDIO RECORDER |
| No.15 | 192.168.111.15 | (15) | SY | (AB) | TONE GENERATOR |
| No.16 | 192.168.111.15 | (15) | SY | (AC) | KEYBOARD |
| No.17 | 192.168.111.16 | (16) | MC | (AM) | MICROPHONE |
| No.18 | 192.168.111.17 | (17) | CD | (AN) | CD PLAYER |
| . | . | . | . | . |  |

FIG. 3

| SUBJECT | INPUT CONNECTION | OUTPUT CONNECTION |
|---|---|---|
| (AA) SERVER | × | × |
| (AB) TONE GENERATOR | (AC) KEYBOARD | (AD) SPEAKER |
|  | (AH) AUTO. ACCOMPANIMENT | (AK) EFFECTOR |
|  | (AI) MIDI RECORDER | (AL) AUDIO RECORDER |
|  | (AJ) EDITOR | (AF) MIXER |
| (AC) KEYBOARD | × | (AB) TONE GENERATOR |
|  |  | (AG) MIDI RECORDER |
|  |  | (AJ) EDITOR |
| (AD) SPEAKER | (AB) TONE GENERATOR | × |
|  | (AF) MIXER |  |
|  | (AK) EFFECTOR |  |
|  | (AL) AUDIO RECORDER |  |
|  | (AM) MICROPHONE |  |
|  | (AN) CD PLAYER |  |
| ⋮ | ⋮ | ⋮ |

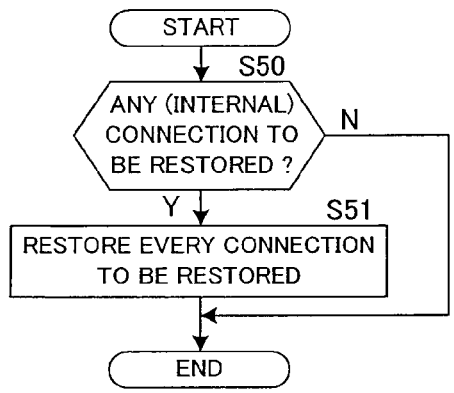
F I G. 7
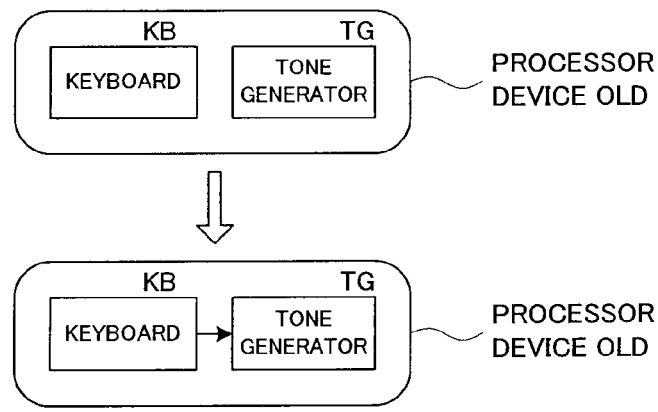
F I G. 8
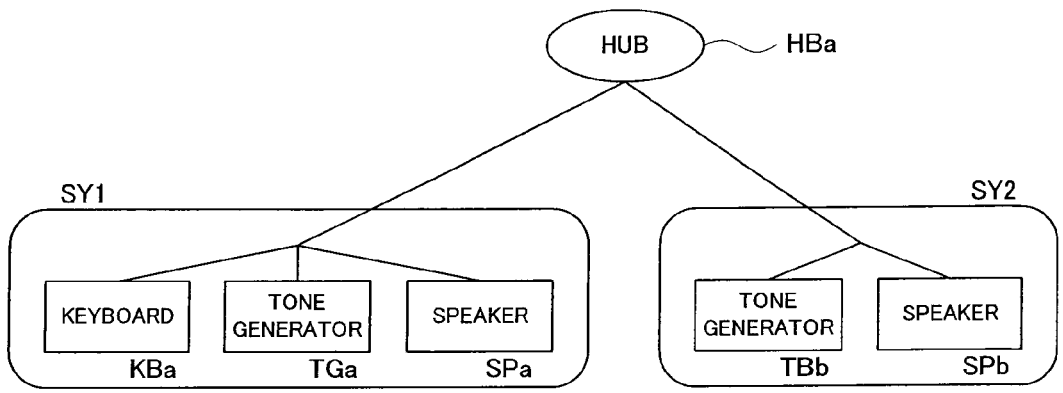
F I G. 9

CONNECTION BUFFER

| ● CASE OF SY1 KEYBOARD | OUTPUT 1 → SY2 TONE GENERATOR → SY1 SPEAKER |
|---|---|
| ● CASE OF SY2 TONE GENERATOR | INPUT 1 ← SY1 KEYBOARD<br>INPUT 1 → OUTPUT 1<br>OUTPUT 1 → SY2 SPEAKER |

CURRENT BUFFER

| ● CASE OF SY1 | KEYBOARD TONE GENERATOR | PORT 1 : OUTPUT → SY2 TONE GENERATOR |
| --- | --- | --- |
| | SPEAKER | PORT 2 : INPUT ← SY2 TONE GENERATOR |

| ● CASE OF SY2 | TONE GENERATOR | PORT 1 : INPUT ← SY1 KEYBOARD |
| --- | --- | --- |
| | | PORT 1 → PORT 2 |
| | | PORT 1 → PORT 3 |
| | | PORT 2 : OUTPUT → SY1 SPEAKER |
| | | PORT 3 : OUTPUT → SY2 SPEAKER |
| | SPEAKER | PORT 3 : INPUT ← SY2 TONE GENERATOR |

TONE GENERATION SYSTEM CONTROLLING THE MUSIC SYSTEM

CROSS-REFERENCE TO RELATED APPLICATIONS

This application is a division of U.S. patent application Ser. No. 11/582,493, filed Oct. 16, 2006, which claims priority to Japanese Application No. 2005-304030, filed Oct. 19, 2005, Japanese Application No. 2005-304031, filed Oct. 19, 2005, Japanese Application No. 2005-304032, filed Oct. 19, 2005, and Japanese Application No. 2005-304033, filed Oct. 19, 2005, the entire disclosures of which are incorporated herein by reference.

BACKGROUND OF THE INVENTION

The present invention relates to a tone generation system composed of a plurality of processor devices connected to a network.

So-called MIDI (Musical Instrument Digital Interface) technique has heretofore been known, via which a plurality of musical instruments are connected with each other to constitute an electronic musical instrument network system. The MIDI standard is a common standard for transmitting automatic performance data etc., which allows performance data, such as a key code, to be transmitted, in a single direction, from a given one of a plurality of electronic musical instruments distributed in a network to another one of the electronic musical instruments. With the MIDI technique, each MIDI message is in the form of serial data and MIDI lines are wired to connect between the instruments in series, so that the MIDI lines would occupy a considerable space. Further, if any one of the MIDI lines is disconnected even at one point by accident or by error, no signal can be delivered beyond that point any longer, which would result in unwanted termination of tone generation. Further, once the MIDI lines are disconnected, wiring operation for restoring the connection would become very cumbersome and laborious.

Therefore, "mLAN" (musical Local Area Network) has been proposed as a musical instrument system using a network. The mLAN is a technique for transmitting digital audio/MIDI data using the IEEE1394 standard, which permits communication of digital audio/MIDI data of 256 channels or over by connecting between AV devices and/or electronic devices and a computer system via IEEE1394 interface. The mLAN defines commands for, for example, controlling individual AV devices and/or electronic devices and corporation among the devices on the basis of the "IEC61833-6 Audio and Music Data Transmission Protocol" that is a protocol for communicating audio/MIDI data via the IEEE1394 interface. With such an mLAN, complicated connections between a plurality of devices, which used to be made using analog cables, MIDI cables, etc., can be replaced with daisy-chain connections of IEEE 1394 cables to thereby greatly simplify the connections between the devices.

However, because the mLAN is in the form of daisy-chain connections, physically connecting a new device to a desired point of the network and then performing logical connection setting would involve extremely difficult operation. Further, because lines are wired to connect between the individual devices in series, the lines would occupy a considerable space. Further, if any of the lines is disconnected even at a single point by accident or by error, no signal can be delivered beyond that point any longer, which would result in unwanted termination of tone generation. Further, once the lines are disconnected, wiring operation for restoring the connection would become very cumbersome and laborious.

Further, in a network where a plurality of electronic musical instruments are distributively connected, performance control information is sent as a packet to a transmission path. However, if the packet is undesirably lost in the middle of the transmission, there would arise the problem that a receiving end may receive performance control information that should not be received and thus the receiving end may fail to operate normally. For example, if key-on data is lost, key-off data sent following the key-on data may be received although the corresponding key-on has not been received.

Further, "LAN" (Local Area Network) has been known as a network capable of connecting a new device to a desired point. The LAN is a computer network, such as an intranet, installed within a relatively limited area, and in recent years, such a LAN is built in an ordinary house as well. However, there presently exists no tone generator or other tone-generation-related device that can be connected directly to a LAN, and it has been impossible to build a musical instrument system using an ordinary form of network, such as a LAN. Further, because tone-generation-related devices capable of being connected to a network are fixed in function, it has been necessary to connect to a network a plurality of types of devices having necessary functions.

Further, for a device having a plurality of functions, such as an electronic keyboard instrument having three functions of a keyboard (operator unit), tone generator and speaker, settings are made such that tones are reproduced through communication among these three functions. Where such a device having a plurality of functions is connected to a network, there would be presented the problem that the functions of the connected device can not be handled on the network independently of one another.

SUMMARY OF THE INVENTION

In view of the foregoing, it is an object of the present invention to provide a tone generation system which can use an ordinary network, such as a LAN, to physically connect processor devices, capable of functioning as a tone generator and various other types of tone-generation-related devices, to desired points of the network and to build a tone generation system by combining the various processor devices connected to the network. It is another object of the present invention to build a tone generation system which can be reliably prevented from performing false operation.

In order to accomplish the above-mentioned objects, the present invention provides a tone generation system composed of a plurality of processor devices connected to a star-type network with the individual processor devices arranged to function as processing elements corresponding to respective programs executed in the processor devices, in which each of the processor devices is capable of selecting and setting a destination processing element that should receive a frame transmitted from the processing element functioning in the processor device and in which communication can be carried out between the processing elements using a communication protocol intended for retransmission control.

With the present invention arranged in the aforementioned manner, the processor devices, functioning as tone generators and various other types of tone-generation-related devices, can be readily connected to desired points on the network by being physically connected to a hub using an ordinary network, such as a LAN. Further, by performing the retransmission control, the present invention can prevent false operation or malfunction of the tone generation system. Further, each of the processor devices has a connection table listing, for each of processing elements functioning in all processor devices connected to the network, other processing elements connectable to an input and output of that processing element, so that setting of processing elements to be logically connected to the network can be readily performed with reference to the connection table.

According to another aspect of the present invention, there is provided a tone generation system composed of a plurality of processor devices connected to a star-type network with the individual processor devices arranged to function as processing elements corresponding to respective programs executed in the processor devices, in which each of the processor devices can not only select, from among a plurality of processing elements, the processing element to function in the processor device, but also be set to function as the processing element. The selected processing element is registered into the server. With such arrangements, the processor devices can be readily connected to desired points on the network by being physically connected to a hub, in the same manner as set forth above. Further, because, when the processing element functioning in a given one of the processor device has been switched to another processing element, the switched-to (i.e., newly-selected) processing element is registered into the server, the present invention can appropriately maintain relationship between the processor devices and the processing elements.

According to still another aspect of the present invention, there is provided a tone generation system composed of a plurality of processor devices connected to a star-type network with the individual processor devices arranged to function as processing elements corresponding to respective programs executed in the processor devices, in which a given processor device where a plurality of processing elements are functioning has been connected to the network, the connection between the plurality of processing elements is canceled (disconnected) so that the plurality o processing elements can be connected to the network independently of each other. By cancellation of the connection between the plurality of processing elements in the given processor device, each of the processing elements can be handled on the network as if the processing element were a separate, independent device. Thus, the present invention allows all of the processing elements, provided by the processor devices on the network, to be connected to the network independently of each other, thereby permitting a great variety of connections.

According to still another aspect of the present invention, there is provided a tone generation system composed of a plurality of processor devices connected to a star-type network with the individual processor devices arranged to function as processing elements corresponding to respective programs executed in the processor devices, in which when a connection is to be made between given processing elements on the network, the connection is established, in a processor device functioning as a connection-originating processing element, in accordance with a setting for connecting between the connection-originating processing element and a connection-partner processing element, and a connection instruction for connecting between the connection-partner processing element and another processing element is sent to a second processor device, functioning as the connection-partner processing element, to establish a connection between the connection-partner processing element and the other processing element in accordance with a setting for connecting between the connection-partner processing element and the other processing element. Thus, in connecting (cascading) a plurality of processing elements, connections of all of the cascaded processing elements can be set collectively via any one of the processor devices where these processing elements are functioning. Further, setting of the connections can be performed in another processor device different from the processor devices where the processing elements to be connected are functioning.

The present invention may be constructed and implemented not only as the apparatus invention as discussed above but also as a method invention. Also, the present invention may be arranged and implemented as a software program for execution by a processor such as a computer or DSP, as well as a storage medium storing such a software program. Further, the processor used in the present invention may comprise a dedicated processor with dedicated logic built in hardware, not to mention a computer or other general-purpose type processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the objects and other features of the present invention, its preferred embodiments will be described hereinbelow in greater detail with reference to the accompanying drawings, in which:

FIG. 2 is a diagram outlining a process for generating a MAC frame to be output to a network in the tone generation system of the present invention;

FIG. 3 is a diagram showing a device table indicative of correspondence among various identification information of all processing elements resident on an internal network shown in FIG. 1;

FIG. 7 is a flow chart of network disconnection processing performed when a processor device has been disconnected from (logged off) the internal network in the tone generation system of the present invention;

FIG. 8 is a diagram showing part of the network disconnection processing in the tone generation system of the present invention;

FIG. 9 is a block diagram showing an example setup of the internal network in the tone generation system of the present invention;

DETAILED DESCRIPTION OF THE INVENTION

Figure 1:
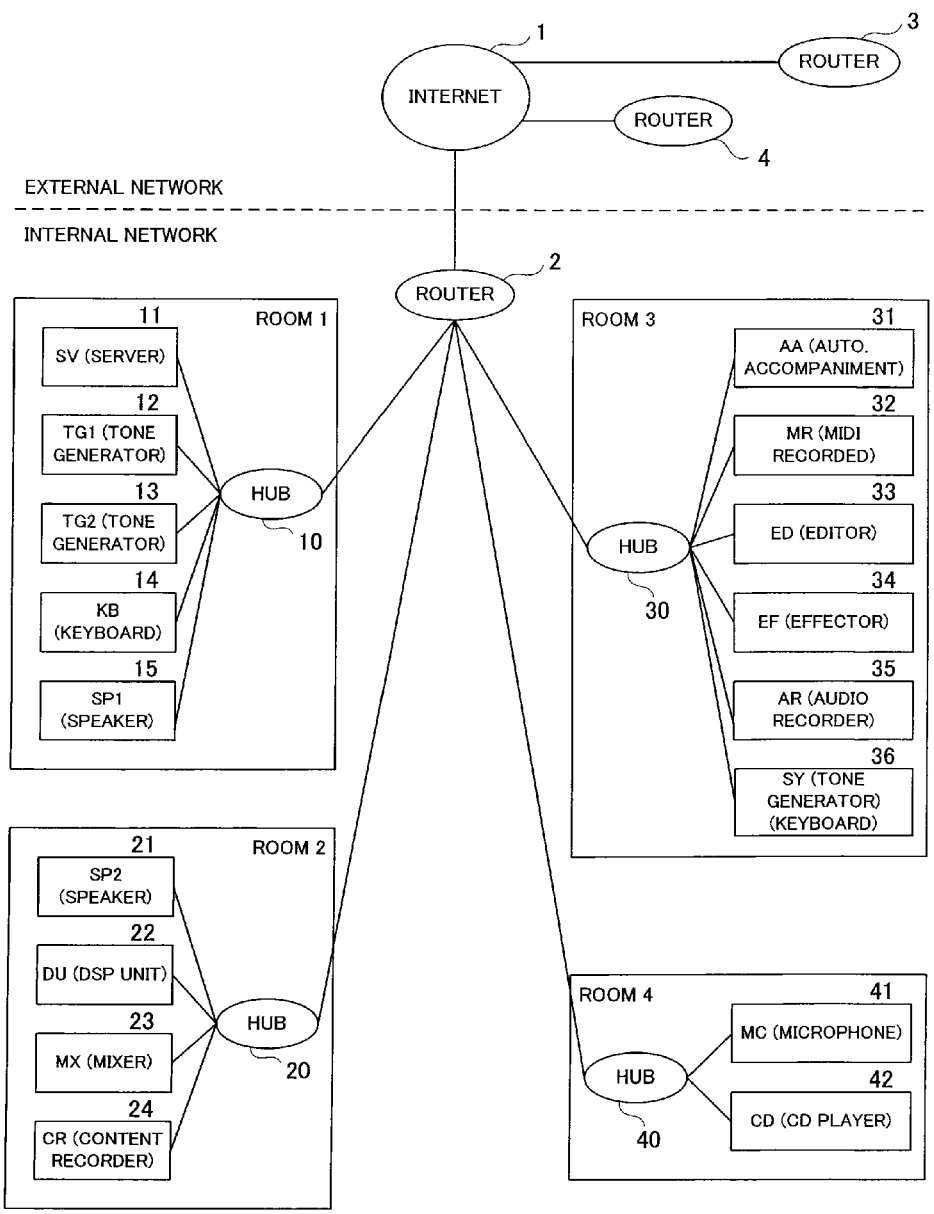
FIG. 1 is a block diagram showing an example setup of a tone generation system in accordance with an embodiment of the present invention.

FIG. 1 is a block diagram showing an example setup of a tone generation system in accordance with an embodiment of the present invention.

As shown in FIG. 1, the tone generation system includes an internal network connectable to an external network. The internal network is in the form of a LAN, such as Ethernet, and built in a house. The internal network includes a router 2, and hubs 10, 20, 30 and 40 connected to a plurality of LAN terminals of the router 2 via LAN cables. The internal network is a star-type network built across four rooms, i.e. Room 1, Room 2, Room 3 and Room 4. WAN terminal of the router 2 is connected to the Internet 1, and routers 3 and 4 connected to other networks are also connected to the Internet 1. Thus, the internal network is connectable, via the router 2 and Internet 1, to the other networks that are connected with the routers 3 and 4.

In Room 1, there are installed several devices, i.e. SV (server) 11, TG1 (tone generator) 12, TG2 (tone generator) 13, KB (keyboard) 14 and SP1 (speaker) 15. These devices are provided with network adaptors to function as LAN devices. Upstream LAN terminal of the hub 10 provided in Room 1 is connected with a LAN terminal of the router 2 via a LAN cable, and a plurality of downstream LAN terminals of the hub 10 are connected, via LAN cables, with LAN terminals of the respective network adaptors of the SV (server) 11, TG1 (tone generator) 12, TG2 (tone generator) 13, KB (keyboard) 14 and SP1 (speaker) 15. In this specification, the "LAN device" is defined as a device capable of communicating data in accordance with a communication protocol, such as an Ethernet protocol.

In Room 2, there are installed several devices, i.e. SP2 (speaker) 21, DU (DSP unit) 22, MX (mixer 23) and CR (content recorder) 24. These devices are provided with network adaptors to function as LAN devices. Upstream LAN terminal of the hub 20 provided in Room 2 is connected with the LAN terminal of the router 2 via a LAN cable, and a plurality of downstream LAN terminals of the hub 20 are connected, via LAN cables, with LAN terminals of the respective network adaptors of the SP2 (speaker) 21, DU (DSP unit) 22, MX (mixer 23) and CR (content recorder) 24.

In Room 3, there are installed several devices, i.e. AA (automatic accompaniment device) 31, MR (MIDI recorder) 32, ED (editor) 33, EF (effector) 34, AR (audio recorder) 35 and SY (tone generator/keyboard) 36. These devices are provided with network adaptors to function as LAN devices. Upstream LAN terminal of the hub 30 provided in Room 3 is connected with the LAN terminal of the router 2 via a LAN cable, and a plurality of downstream LAN terminals of the hub 30 are connected, via LAN cables, with LAN terminals of the respective network adaptors of the AA (automatic accompaniment device) 31, MR (MIDI recorder) 32, ED (editor) 33, EF (effector) 34, AR (audio recorder) 35 and SY (tone generator/keyboard) 36.

Further, in Room 4, there are installed a plurality of devices, i.e. MC (microphone) 41 and CD (CD player) 42. These devices are provided with network adaptors to function as LAN devices. Upstream LAN terminal of the hub 40 provided in Room 4 is connected with the LAN terminal of the router 2 via a LAN cable, and a plurality of downstream LAN terminals of the hub 40 are connected, via LAN cables, with LAN terminals of the respective network adaptors of the MC (microphone) 41 and CD (CD player) 42.

Each of the devices installed in Room 1-Room 4 and connected to the internal network in the tone generation system is a stand-alone device. Each of these devices, except for the DU (DSP unit) 22, is provided with at least a CPU (Central Processing Unit), RAM (Random Access Memory) and ROM (Read-Only Memory) and corresponding hardware. Namely, each of the devices in the tone generation system of the present invention performs a particular function as represented by the name of the device, through execution of a program corresponding to the name of the device. Namely, the devices, except for the DU (DSP unit) 22, in the tone generation system of the present invention are processor devices (computers) capable of performing various programs. Hereinafter, the functions performed by the processor devices executing the programs are defined as "processing elements". Namely, the SV (server) 11, TG1 (tone generator) 12, TG2 (tone generator) 13, KB (keyboard) 14 and SP1 (speaker) 15 installed in Room 1, the SP2 (speaker) 21, MX (mixer 23) and CR (content recorder) 24 installed in Room 2, the AA (automatic accompaniment device) 31, MR (MIDI recorder) 32, ED (editor) 33, EF (effector) 34, AR (audio recorder) 35 and SY (tone generator/keyboard) 36 installed in Room 3 and the MC (microphone) 41 and CD (CD player) 42 installed in Room 4 are all processing elements, and the processor devices function as the processing elements by executing the corresponding programs.

The SV (server) 11 is a computer that supplies a client computer with a function and various data possessed thereby, and the client computer is a processor device where any one of the above-mentioned processing elements is functioning. Further, the DU (DSP unit) 22 is a processor device provided with a multiplicity of DSPs and can function as any one of processing elements, such as a mixer, editor and effector, by the DSPs executing corresponding microprograms. Namely, the DU (DSP unit) 22 can switch the processing element that should function to another processing element, by selecting and executing the microprograms corresponding to the other processing element.

The processing elements will be explained here in more detail. The TG1 (tone generator) 12 and TG2 (tone generator) 13 function as tone generator elements by the processor devices executing corresponding tone generator programs. The KB (keyboard) 14 functions as a keyboard element by the processor device, provided with a hardware keyboard, executing a keyboard program. The SP1 (speaker) 15 and SP2 (speaker) 21 function as speaker elements by the processor devices, provided with hardware speakers, executing speaker programs. The MX (mixer) 23 functions as a mixer element by the processor device executing a mixer program. The CR (content recorder) 24 functions as a content recorder element by the processor device, provided with a large-capacity storage device, executing a recorder program. The AA (automatic accompaniment) 31 functions as an automatic accompaniment element by the processor device executing an automatic accompaniment program. The MR (MIDI recorder) 32 functions as a MIDI recorder element by the processor device, provided with a large-capacity storage device, executing a recorder program. The ED (editor) 33 functions as an editor element by the processor device executing an editor program. The EF (effector) 34 functions as an effector element by the processor device executing an effector program. The AR (audio recorder) 35 functions as an audio recorder element by the processor device, provided with a large-capacity storage device, executing a recorder program. The SY (tone generator/keyboard) 36 functions as both a tone generator element and a keyboard element by the processor device, provided with a hardware keyboard, executing a ton generator program and keyboard program. The MC (microphone) 41 functions as a microphone element by the processor device, provided with a hardware microphone, executing a microphone program. Further, the CD (CD player) 42 functions as a CD player element by the processor device, provided with a hardware CD drive, executing a player program.

Through communication, data can be exchanged between the SV (server) 11 and the DU (DSP unit) 22 or any of the processing elements or between the processing elements. In the illustrated example, the SV (server) 11 and the aforementioned processing elements support the TCP/IP (Transmission Control Protocol/Internet Protocol) and perform data-exchanging communication using the TCP/IP protocol.

In the internal network, every information transmitted via the LAN cable is put in a packet of a predetermined length called "MAC frame". The MAC frame has an IP packet capsulated therein, and a preamble for a reception section to find the beginning of the MAC frame and a check code for examining the validness of the contents of the MAC frame are attached to the beginning and end, respectively, of the frame. Further, a MAC address (i.e., Media Access Control address), indicative of a transmission source and transmission destination, is included in a header of the MAC frame. The MAC address is a unique number assigned to each network interface means; in the case of the Ethernet standard, each MAC address consists of 48 bits. Further, each MAC frame is transmitted in accordance with the CAMA/CD (Carrier Sense Multiple Access with Collision Detection) scheme, in accordance with which a data-transmitting node (processor device) monitors a communication state by detecting a carrier wave of the cable in question and starts the transmission when the communication state is "vacant". In case a plurality of nodes (processor devices) start transmission simultaneously, data destruction may result due to collision between the data; thus, when a data collision has been detected, the data transmission is resumed after waiting for a random time period.

The hubs 10-40 are each in the form of a switching hub that functions as a bridge, not a mere repeater, which analyzes data sent from a node (processor device) to thereby detect a destination of the data and then directs the data only to the destination node (processor device).

According to the OSI reference model of the TCP/IP, which is a communication protocol, the "IP" corresponds to a third layer (network layer) while the "TCP" corresponds to a fourth layer (transport layer). The TCP layer supplies an upper-level processing element (application) with a communication function with reliable full-duplex flow control, using a datagram-oriented communication function by the IP layer. In this way, data transmitted by a transmitting end can be received accurately by a receiving end with no data omission, duplication or error in the same order as they were transmitted. Namely, a packet sent by the transmitting end may be lost due to characteristics of the IP layer and lower-level physical transmission medium, data order may be changed due to a delay, or the packet may be received in duplicate due to retransmission. Thus, it has been conventional to secure a communication path, reliable to processing elements in question, by the TCP through elimination of the aforementioned adverse influences. Individual bytes of data to be transmitted and received by the TCP are assigned a series of serial numbers, and whether or not data omission or duplication has occurred is checked using the serial numbers. Receiving end, having received the data, returns an ACK (Acknowledgment) to the transmitting end to inform up to which sequence number it has received the data, so that the transmitting end can confirm that the data has accurately reached the receiving end. If, in such a case, no ACK has been returned from the receiving end after passage of a predetermined time, the transmitting end determines that the packet has been lost on its way or has not been received by the receiving end and then performs control to retransmit the same packet. Such arrangements permit highly-reliable communication. The waiting time before the start of the retransmission is not fixed but dynamically varied depending on conditions, such as the time length before the returning of the ACK and number of retransmissions; in this manner, the waiting time is highly controlled to permit efficient communication.

The tone generation system of the present invention is constructed by combining the processing elements functioning in a plurality of processor devices connected to the internal network shown in FIG. 1. For example, to build a tone generation system where performance data output from the KB (keyboard) 14 are supplied to the TG1 (tone generator) 12 and tone waveform data generated by and output from the TG1 (tone generator) 12 on the basis of the performance data are supplied to the SP1 (speaker) 15, setting is performed to logically connect between the KB (keyboard) 14 and the TG1 (tone generator) 12 and between the TG1 (tone generator) 12 and the SP1 (speaker) 15. Namely, such a tone generation system can be build by combining the processing elements that are functioning in a plurality of processor devices connected to the internal network. Namely, a tone generation system can also be build by logically connecting between the KB (keyboard) 14, the tone generator function of the SY (keyboard/tone generator) 36 and the SP2 (speaker) 21. In such a case, it is possible to impart an effect to tone waveform data and mix a plurality of sets of tone waveform data, by further logically connecting the EF (effector) 34 and MX (mixer) 23.

As set forth above, the processing elements functioning in the individual processor devices can be logically connected via the LAN, so that data can be exchanged or communicated between the logically-connected processing elements. For example, where the KB (keyboard) 14 and TG1 (tone generator) 12 are logically connected with each other, performance data output from the KB (keyboard) 14, which is a processing element, can be communicated to the TG1 (tone generator) 12 which is another processing element. In such a case, performance data output in a packet from the KB (keyboard) 14 are received by the TG1 (tone generator) 12. FIG. 2 is a diagram outlining a process in accordance with which a MAC frame is generated by a processing element at a transmitting end and output to the network.

As illustrated in FIG. 2, data output from the processing element at the transmitting end are divided into transmitting data each having a predetermined length, and a TCP segment is generated in the TCP layer by attaching a TCP header to the beginning of the transmitting data of the predetermined length. The TCP header includes a sequence number, port number of the transmitting-end (i.e., transmitted-from or transmission-source) processing element and port number of a receiving-end (i.e., transmitted-to or transmission-destination) processing element. IP packet is generated in the IP layer by attaching an IP header to the beginning of the TCP segment. The IP header includes IP addresses of the transmission-source and transmission-destination processing elements, and also includes data indicative of a packet length, protocol number, etc. although not specifically shown. The IP address is a specific identification number uniquely assigned to each individual processor device connected to the internal network and external network including the Internet; in the case of "IPv4", the IP address is in the form of numerals of a total of 32 bits consisting of four 8-bit groups, more specifically four decimal numerals in the range of 0-255, like "192. 168. 100. 8". MAC header is attached to the beginning of the IP packet, in a data link layer and physical layer, to generate a MAC frame. The MAC header includes a specific transmission-source MAC address uniquely assigned to the transmission-source processor device, and a specific destination MAC address uniquely assigned to the transmission-destination processor device. The thus-generated MAC frame is sent out from the transmission-source processor device to the LAN cable and received by the processor device of the address matching the destination MAC address of the MAC frame, so that the transmitting data is passed to the processing element identified by the IP address and port number. Namely, the port number is a sub-address of the IP address, and the processing element is identifiable by a combination of the IP address and port number. Thus, even for a single processor device where a plurality of processing elements are functioning, like the SY (tone generator/keyboard) 36, transmitting data can be passed to each of the processing elements through identification based on the combination of the IP address and port number.

FIG. 3 is a diagram showing a device table indicative of correspondence among various identification information of all processing elements resident on the internal network shown in FIG. 1. The device table shown here contains information of all of the processing elements functioning in the processor devices included in a broadcast domain. The device table is created by the SV (server) 11, and the same device table (i.e., same contents) is recorded into all of the processor devices on the internal network. When any of the processor devices connected to the internal network has been changed, the contents of the device table are updated by the SV (server) 11, and the thus-updated device table is transmitted from the SV (server) 11 to all of the processor devices on the internal network. Each of the processor devices connected to the internal network receives the device table and records therein the received device table.

In the device table shown in FIG. 3, logical device IDs correspond to the port numbers of the processing elements, and a unique or different ID is assigned to each of the processing elements. The IP address is a specific identification number uniquely assigned to each one of the processor devices connected to the internal network and external network including the Internet. When any one of the processor devices has logged into the network, a DHCP (Dynamic Host Configuration Protocol) server assigns one previously-prepared IP address to the processor device. The router 2 typically becomes such a DHCP server, although the SV (server) 11 or any one of the processor devices too may become the DHCP server. Physical device ID is a specific number uniquely assigned to each network interface means; in the illustrated example of FIG. 3, the physical device ID is a specific number uniquely assigned to each processor device on the internal network. Device name is an abbreviated name of a processor device where a processing element is functioning. Processing ID is an ID predetermined per type of processing element. Processing element name is a name of a tone-generation-related device implemented by a processing element. For a DSP unit of processing device ID "No. 7 ", for example, the device table has recorded therein: processing ID "AE" indicating that the device in question is a DSP unit, and processing element name "DSP unit"; and processing ID (e.g., "AF") indicative of a processing element currently functioning in accordance with currently-executed microprograms, and name of the currently-functioning processing element (e.g., Mixer). Processing element "tone generator" of logical device ID "No. 15" and processing element "keyboard" of logical device ID "No. 16" are assigned the same IP address and same physical device ID because they are processing elements functioning in the same processor device; however, these two processing elements are assigned different logical device IDs (port numbers) so that they can be handled independently of each other.

In each of the processor devices of the tone generation system of the present invention, a program capable of functioning as the aforementioned processing element is stored in its storage means, such as a hard disk device. By executing such a program stored in the storage means, the processor device can function as the processing element corresponding to the program. In this case, any one processor device can simultaneously execute a plurality of programs; in other words, the one processor device can function as a plurality of processing elements. When the processor device has come to function as the processing element corresponding to the program through execution, in the processor device, of the program, the processing element in question is registered into the SV (server) 11 so that the logical device ID (port number) is set for the processing element. Then, the device table having been updated in the SV (server) 11 is transmitted to and recorded into all of the processor devices on the internal network.

Data communicated between the processing elements in the tone generation system of the present invention are classified into two types, i.e. substantive data and control data. Here, data that are directly indicative of contents of music to be reproduced and that are to be communicated preferentially in real time are defined as the substantive data. More specifically, MIDI data and audio data (PCM and MP3 data) are examples of the substantive data. The other data than the substantive data are defined as the control data. transmission/reception of the control data can be performed by all of the processor devices including the SV (server) 11.

Figures 4, 5:
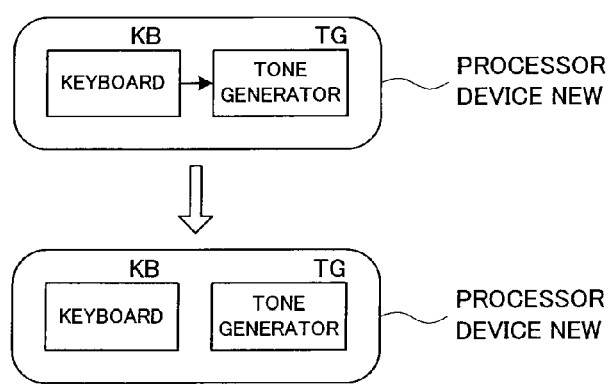
FIG. 4 is a diagram showing a connection table having recorded therein connections at inputs and outputs of individual processing elements resident on the internal network and capable of communication of substantive data.
FIG. 5 is a diagram showing part of network connection processing in the tone generation system of the present invention.

FIG. 4 shows a connection table having recorded therein connections of other processing elements at the input and output (i.e., input and output connections) of each individual processing element resident on the internal network and capable of substantive data communication. The connection table is created by the SV (server) 11, and the same device table (i.e., same contents) is recorded into all of the processor devices resident on the internal network. In this connection table, there is recorded information about each of the processing elements functioning in the processor devices connectable to the internal network shown in FIG. 1. Each of the processor devices connected to the internal network obtains the connection table from the SV (server) 11 and records therein the obtained connection table.

FIG. 4 shows only a part of the connection table pertaining to some of the processing elements on the internal network organized in the manner as shown in FIG. 1. In the connection table, "x" indicates that there is no connectable processing element; thus, it is indicated that the server of processing ID "AA" (i.e., SV (server) 11 shown in FIG. 1) does not perform substantive data transmission/reception. The server here is the SV (server) 11 of FIG. 1. Tone generator element of processing ID "AB" is connectable at its input with processing elements that transmit performance data, such as MIDI data, as the substantive data and connectable at its output with processing elements that receive audio data as the substantive data. Namely, the tone generator element of processing ID "AB" is connectable at its input with a keyboard element of processing ID "AI", automatic accompaniment element of processing ID "AH", MIDI recorder element of processing ID "AI" and editor element of processing ID "AJ", and the tone generator element of processing ID "AB" is connectable at its output with a speaker element of processing ID "AD", effector element of processing ID "AK", audio recorder element of processing ID "AL" and mixer element of processing ID "AF". Further, a keyboard of processing ID "AC" is connectable at its output with processing elements that receive performance data, such as MIDI data, as the substantive data, but not connectable at its input with any processing element because of its nature. Namely, the keyboard of processing ID "AC" is connectable at its output with the tone generator element of processing ID "AB", MIDI recorder element of processing ID "AI" and editor element of processing ID "AJ". Further, the speaker of processing ID "AD" is connectable at its input with processing elements that transmit audio data, but not connectable at its output with any processing element because of its nature. Namely, the speaker of processing ID "AD" is connectable at its input with the tone generator element of processing ID "AB", mixer element of processing ID "AF", effector element of processing ID "AK", effector element of processing ID "AK", audio recorder element of processing ID "AL", microphone element of processing ID "AM", CD player element of processing ID "AN", etc. Namely, the connection table indicates, per processing element, other processing elements connectable with the input and output (i.e., input-connectable and output-connectable processing elements) of the processing element, and the user can select any desired ones of such input-connectable and output-connectable processing elements with reference to the connection table.

Figure 6:
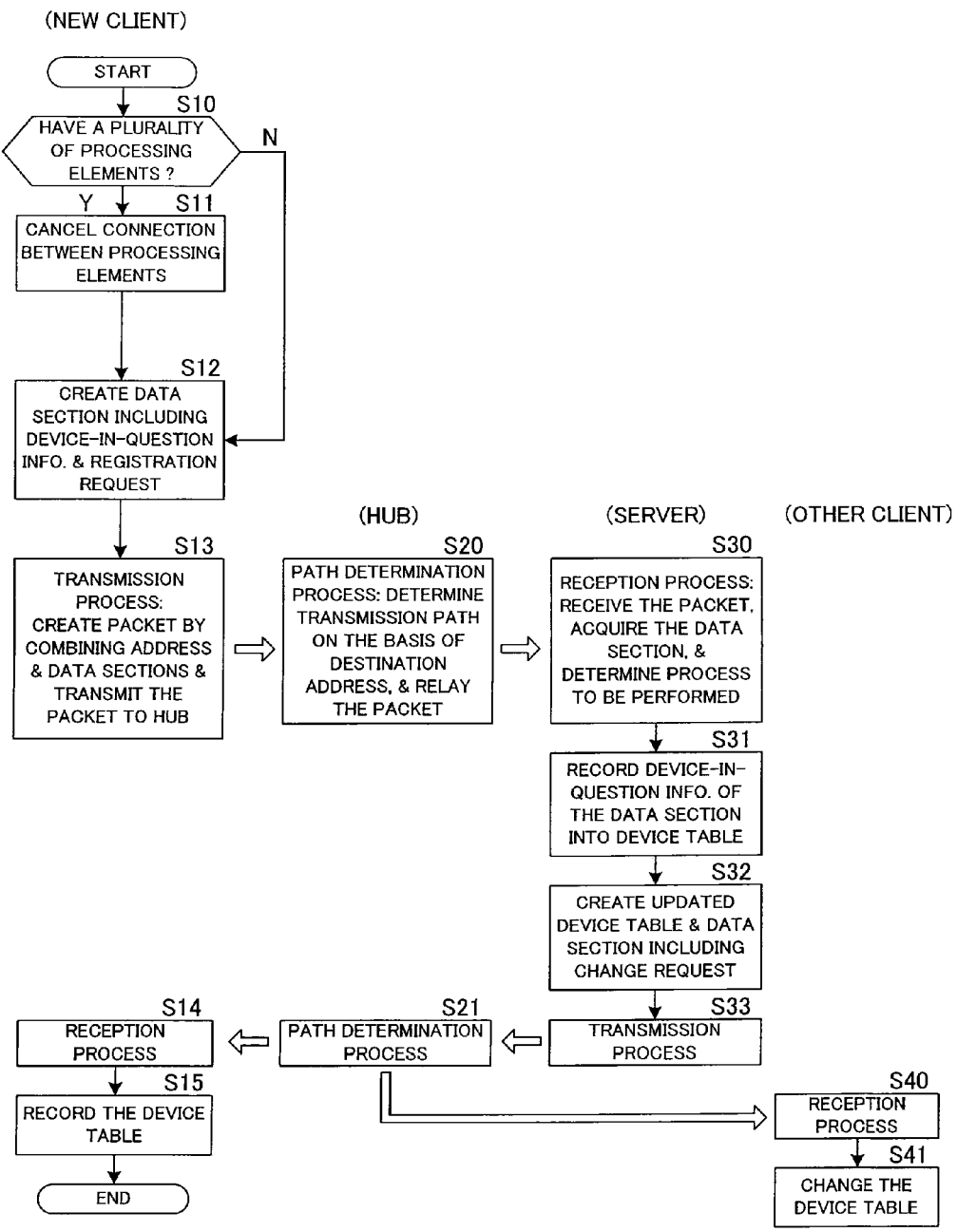
FIG. 6 is a flow chart of the network connection processing performed when a processor device has been connected to (logged into) the internal network in the tone generation system of the present invention.

FIG. 6 is a flow chart of network connection processing performed when a given processor device has been newly connected to (logged into) the internal network of the tone generation system shown in FIG. 1. Here, the term "client" represents a client of the SV (server) 11, and all of the other processor devices than the SV (server) 11, resident on the network, can be clients, and control data are communicated between each of the clients and the SV (server) 11 using the IP address of the destination processor device and predetermined port number of the control data. In FIG. 6, a flow of operations performed by the newly-connected client is shown in a left-side, "new client" section of the figure, a flow of operations performed by the hub is shown in a middle, "hub" section of the figure, a flow of operations performed by the server is shown in a "server" section to the right of the "hub" section of the figure, and a flow of operations performed by an already-connected client is shown in a right-side, "other client" section of the figure.

Once the instant network connection processing is started up, a determination is made, at step S10, as to whether the newly-connected client has a plurality of processing elements. If the newly-connected client is currently functioning as the keyboard element KB and tone generator element TG by executing a keyboard program and tone generator program, like a processor device NEW indicated in an upper section of FIG. 5, and the keyboard element KB and tone generator element TG are connected in such a manner that MIDI data generated by the keyboard element KB are supplied to the tone generator element TG, then a YES determination is made at step S10, so that the instant processing goes on to step S11 in order to disconnect or cancel the internal connection between the keyboard element KB and the tone generator element TG as illustrated in a lower section of FIG. 5. Thus, in the processor device NEW where the plurality of processing elements are functioning, the connection between the processing elements are automatically disconnected upon log-on; with such an arrangement, operation for disconnecting the connection in advance before the log-on can be omitted. After completion of the operation of step S11 or if the newly-connected client does not have a plurality of processing elements as determined at step S10, the processing jumps to step S12 in order to create a data section including device-in-question information (i.e., information indicative of the newly-connected device) and registration request. The device-in-question information is information indicative of the IP address (assigned to the new client by the DHCP server when the client logged into the internal network), physical device ID and processing IDs and names of all of the processing elements in the newly-connected device, while the registration request is a request for registration of the device-in-question information into the device table located in the SV (server) 11. At following step S13, a transmission process is performed, where the data section created at step S12 is formed into transmitting data, a MAC frame is formed with the transmitting data ultimately capsulated therein as illustrated in FIG. 2, and the thus-formed MAC frame is then transmitted to the internal network. In the MAC header of the MAC frame, the MAC address (physical device ID) of the SV (server) 11 is set as a destination MAC address.

Because the internal network is a "star" type network, the MAC frame transmitted from the new client is received by one of the hubs, and a path determination process is performed by the hub (step S20). In the path determination process, the hub determines a transmission path, on the basis of the destination MAC address of the received MAC frame, to relay the MAC frame. When the new client has been physically connected to the hub 30, for example, the hub 30 relays the received MAC frame to the router 2, then the router 2 relays the MAC frame to the hub 10, and thence the hub 10 relays the MAC frame to the SV (server) 11. In this manner, the MAC frame transmitted from the new client is received by the SV (server) 11 of the address matching the destination MAC address, and the SV (server) 11 carries out a reception process on the MAC frame (step S30). In the reception process, the IP packet is taken out from the MAC frame, then the TCP segment is taken out from the IP packet, and thence the data section is taken out from the TCP segment. Then, the SV (server) 11 reads the data section and judges, because of the registration request present in the data section, that a registration request process is to be performed. At next step S31, the SV (server) 11 records, into the device table, the device-in-question information of the data section and the logical device ID assigned to the processing element of the new client by the SV (server) 11. At following step S32, the SV (server) 11 creates an updated device table and data section including a change request requesting that the device table be changed or updated. The thus-created data section is transmitted from the SV (server) 11 to the internal network through a transmission process performed at step S33. This transmission process is similar to the transmission process of step S13 above, except that an "all-one" broadcast address (FF-FF-FF-FF-FF-FF) is set as the destination MAC address and a broadcast address is set as a destination IP address too. If the network address of the internal network address is set at "192. 168. 111. 0" as in the device table of FIG. 3, the broadcast address of the IP address is set to "192. 168. 111. 255".

The MAC frame broadcast by the SV (server) 11 is received by the hub 10, and the hub 10 performs a path determination process (step S21). The path determination process of step S21 is similar to the path determination process of step S20 above; however, at step S21, the MAC frame is relayed, via the router 2 and hubs 10-40, to all of the processor devices because the MAC frame has been set to the broadcast address. Upon receipt of the broadcast MAC frame, the new client performs a reception process on the MAC frame of the broadcast address at step S14 in a similar manner to step S30 above. In the reception process of step S14, the new client reads the data section and judges, because of the device-table change request present in the data section, that a device-table change process is to be performed, and the device table, stored in the internal storage means of the new client, is updated in accordance with device table information taken out from the received MAC frame. After that, the network connection processing in the new client is brought to an end. The other client performs a reception process on the MAC frame of the broadcast address at step S40 in a similar manner to step S30 above. In the reception process of step S40, the other client reads the data section and judges, because of the device-table change request present in the data section, that a device-table change process is to be performed, and the device table, stored in its internal storage means, is updated at step S41 in accordance with device table information taken out from the received MAC frame. After that, the network connection processing in the other client is brought to an end.

FIG. 7 is a flow chart of network disconnection processing performed when any one of the processor devices connected to the internal network has been disconnected (logged off) from the internal network.

Once any one of the processor devices so far connected to the internal network has been disconnected (logged off), the network disconnection processing is started up. First, a determination is made, at step S50, as to whether the disconnected processor device has a plurality of processing elements and has any connection to be restored between the processing elements. If it has been determined at step S50 that the disconnected processor device has a plurality of processing elements and has any (internal) connection to be restored like a processor device OLD shown in an upper section of FIG. 8, the processing goes to step S51, where every connection to be restored between the plurality of processing elements is restored. In this case, information defining between which processing elements a connection is to be restored may be prestored in a memory so that the connection between the processing elements can be restored with reference to the prestored information. For example, in the case of the processor device OLD having the keyboard element KB and tone generator element TG as illustrated in the upper section of FIG. 8, the keyboard element KB and tone generator element TG are internally connected with each other, as illustrated in a lower section of FIG. 8, so that MIDI data generated by the keyboard element KB can be supplied to the tone generator element TG. After completion of the operation of step S51 or NO determination at step S50, the network disconnection processing is brought to an end. Thus, in the processor device OLD where the plurality of processing elements are functioning, the connection between the processing elements is automatically restored so that the processing elements may be used without particular operation being performed for reconnecting between the processing elements. Whereas the processing elements are internally connected with each other using, for example, API (Application Program Interface), they may be interconnected external through logical connection using the port numbers assigned to the processing elements.

The SV (server) 11 periodically performs a client check process for checking presence of a client on the internal network, and, when any disconnected client has been detected through the client check process, it deletes the information of the disconnected client from the device table, to thereby update the device table. Then, the SV (server) 11 broadcasts the thus-updated device table to all of the clients, so that the device table stored in each of the clients can be updated with the updated device table broadcast from the SV (server) 11.

Figure 10:
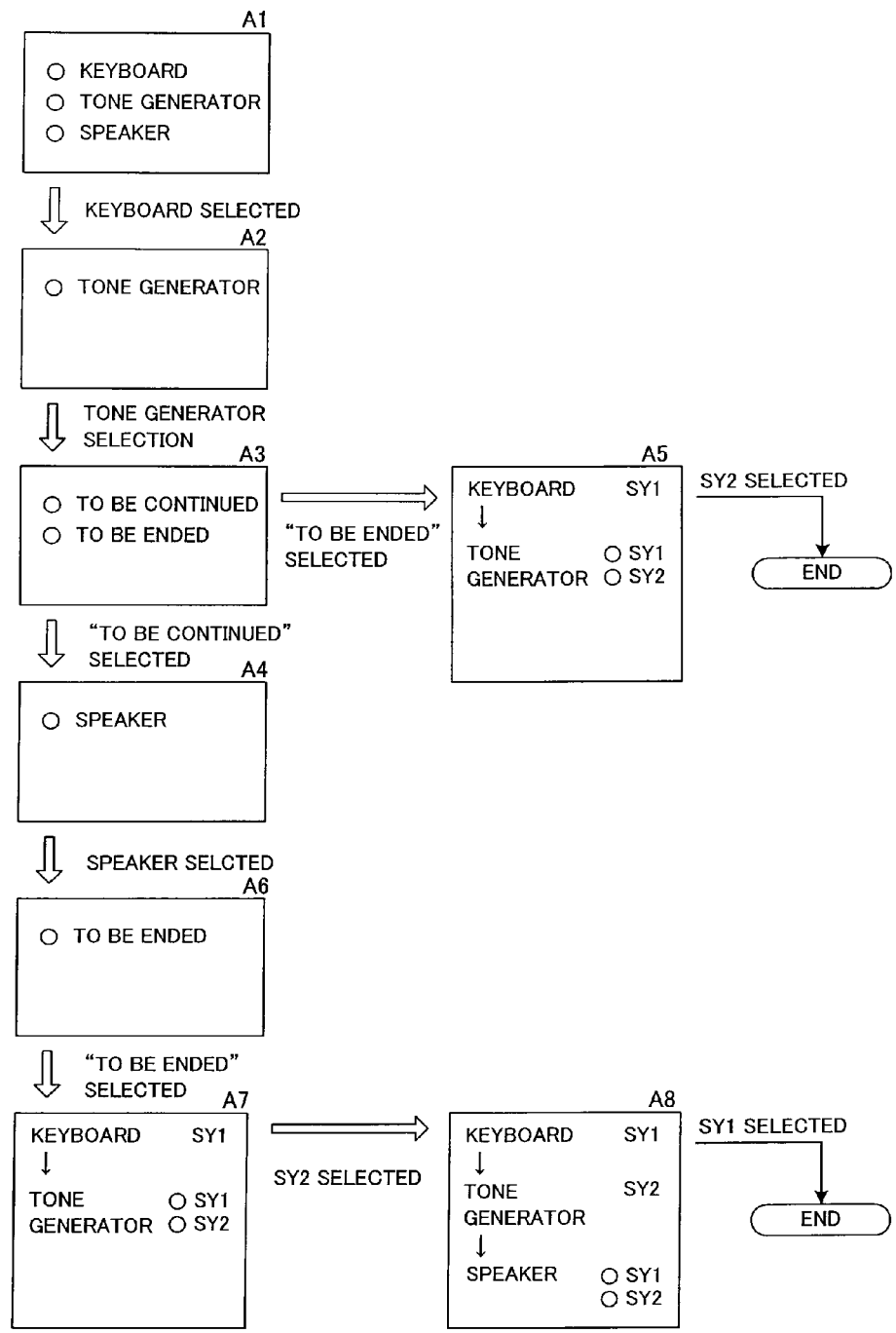
FIG. 10 is a diagram showing examples of setting screens displayed when connections are to be made between processing elements in the tone generation system of the present invention.
Figure 11:
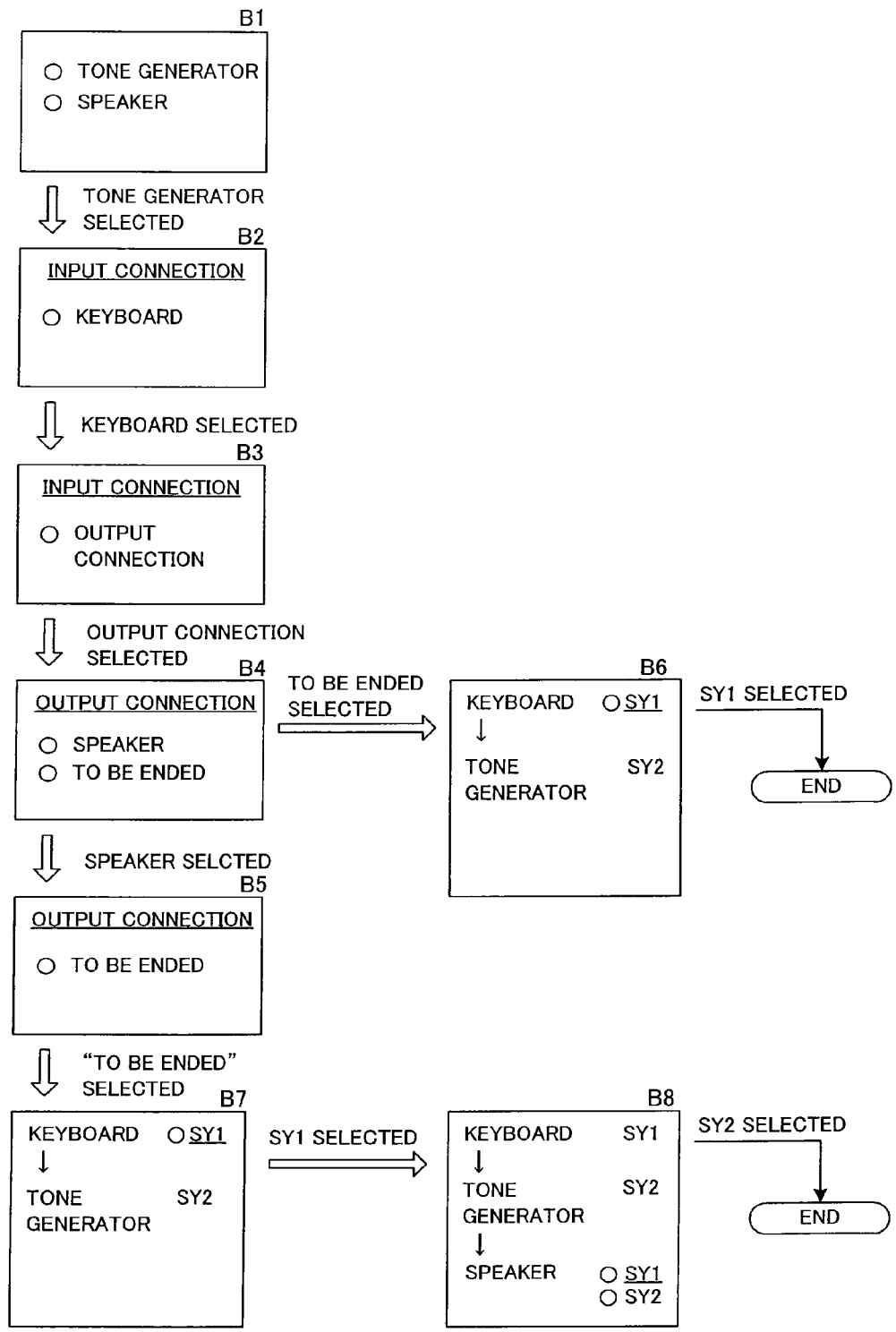
FIG. 11 is a diagram showing other examples of setting screens displayed when connections are to be made between processing elements in the tone generation system of the present invention.

FIGS. 10 and 11 show setting screens displayed when a connection is to be made between processing elements. Here, the setting screens are displayed in relation to the internal network of a simplified construction as illustrated in FIG. 9.

In the internal network of FIG. 9, a processor device SY1 where a plurality of processing elements are functioning is connected to a hub HBa via a LAN cable, and a processor device SY2 where a plurality of processing elements are functioning is connected to the hub HBa via a LAN cable. More specifically, a keyboard element KBa, tone generator element TGa and speaker element SPa are functioning in the processor device SY1, and a tone generator element TBb and speaker element SPb are functioning in the processor device SY2. In each of the processor devices SY1 and SY2, the connections between the aforementioned processing elements are logically separate from each other, and each of the processing elements is connected to the internal network logically independently of each other. In each of the processor devices SY1 and SY2, where the plurality of processing elements are functioning in the aforementioned manner, it is possible to establish connections of the processing elements independently of each other (i.e., independently between the processing elements). Here, a description will be given about a case where the logical connection setting is performed from the keyboard element KBa. In this case, a connection process is started in the processor device SY1, upon which a screen A1 shown in FIG. 10 is displayed on a display of the processor device SY1. The screen A1 displays the three processing elements functioning in the processor device SY1, i.e. keyboard element KBa, tone generator element TGa and speaker element SPa, via which the user can select any desired one of the displayed processing elements as a processing element for which connection setting is to be performed. If the keyboard element KBa is selected on the screen A1 as the processing element for which connection setting is to be performed, a screen A2 shown in FIG. 10 is displayed on the display of the processor device SY1.

The screen A2 displays each processing element that is resident on the internal network of FIG. 9 and connectable with the selected processing element, i.e. keyboard element KBa, via which the user can select any desired one of the displayed connectable processing elements. Such processing elements resident on the internal network of FIG. 9 and connectable with the selected processing element are displayed here with reference to the device table and connection table. In this case, the device table has recorded therein the keyboard element KBa, tone generator element TGa, speaker element SPa, tone generator element TBb and speaker element SPb. Because no processing element is connectable with the input of the keyboard element KBa (i.e., the keyboard element KBa has no input connection function), the connection table has recorded therein only each processing element connectable with the output of the keyboard element KBa. Because only the tone generator element is connectable with the output of the keyboard element KBa, only such an "output-connectable" tone generator element is displayed on the screen A2. Once the output-connectable tone generator element is selected on the screen A2, another screen A3 shown in FIG. 10 is displayed on the display of the processor device SY1. The screen A3 is a screen for the user to make a selection as to whether the processing element connectable with the selected processing element, i.e. tone generator element, is to be further connected ("to be continued") or not ("to be ended"). If the user selects "to be continued", still another screen A4 shown in FIG. 10 is displayed on the display of the processor device SY1. The screen A4 displays processing elements that are connectable with the output of the selected processing element, i.e. tone generator keyboard element, and that are resident on the internal network of FIG. 9, via which the user can select any desired one of the displayed output-connectable processing elements.

Such connectable processing elements resident on the internal network of FIG. 9 are detected with reference to the device table and connection table. In this case, the device table has recorded therein the keyboard element KBa, tone generator element TGa, speaker element SPa, tone generator element TBb and speaker element SPb. Because only the speaker element is connectable with the output of the tone generator element, only such a speaker element is displayed on the screen A4. Once the speaker element is selected on the screen A4, a screen A6 also shown in FIG. 10 is displayed on the display of the processor device SY1. Because no processing element is connectable with the output of the speaker element (i.e., the speaker element has no output connection function), the screen A6 is a screen for the user to select "to be ended". Once the "to be ended" option is selected on the screen A6, still another screen A7 also shown in FIG. 10 is displayed on the display of the processor device SY1. User's selection of the "to be ended" option means that the setting for logically connecting the keyboard element, tone generator element and speaker element in the order mentioned has been completed. In a case where a plurality of processing elements of a same type exist on the internal network, a connection is set individually for each of the same-type processing elements. Therefore, processor devices where the tone generator device selected on the screen A2 is functioning are detected from the internal network with reference to the device table, and then the names of the detected processor devices are displayed on the screen A7 so that the user is allowed to select any one of the displayed processor device names. In the case of the internal network shown in FIG. 9, the processor device SY1 and SY2 are detected, as the processor devices where the tone generator element selected on the screen A2 is functioning, and displayed on the screen A7 so that any one of the processor device SY1 and SY2 is selectable as the tone generator element.

In the case where the tone generator element of the device name "SY2" (or "SY1") has been selected, processor devices where the speaker element selected on the screen A4 is functioning are detected from the internal network, and then the names of the detected processor devices are displayed on the screen A8 so that the user is allowed to select any one of the displayed names of the processor devices where the speaker element is functioning. Once the speaker element the device name "SY1" (or "SY2") is selected on the screen A8, the individual processing elements to be connected are determined, and the setting for logically connecting the keyboard element KBa, tone generator element TGb and speaker element SPa in the order mentioned has been completed; in this manner, connection selection processing for connecting between processing elements is completed. Namely, if the selected processing elements are functioning in a plurality of processor devices, screens for the user to select the names of desired ones of the processor devices are sequentially displayed.

Further, in the case where the "to be ended" option has been selected on the screen A3, a screen A5 shown in FIG. 10 is displayed on the display of the processor device SY1. User's selection of the "to be ended" option means that the setting for logically connecting between the keyboard element and the tone generator element in the order mentioned has been completed. In a case where a plurality of processing elements of a same type exist on the internal network, a connection is set individually for each of the same-type processing elements. Thus, processor devices where the selected tone generator element is functioning are detected from the internal network with reference to the device table, and then the names of the detected processor devices are displayed on the screen A5 so that the user is allowed to select any one of the displayed processor device names as a connection destination. Namely, the screen A5 similar in displayed contents to the aforementioned screen A7 is displayed, and, if the tone generator element of the device name "SY2" is selected by the user, the individual processing elements to be connected are determined, and setting for logically connecting between the keyboard element KBa and the tone generator element TGb in the order mentioned is completed; in this manner, the connection selection processing for connecting between the processing elements is completed.

When the connection selection processing for connecting between the processing elements has been completed in the above-described manner, contents of the set connections are recorded into a connection buffer of the processor device for which the setting has been completed. Then, as will be later detailed, connection establishment processing is performed, on the basis of the connection contents recorded in the connection buffer, to establish the logical connections, and information indicative of the established logical connections is recorded into a current buffer.

Now, a description will be given about connection selection setting that is performed from the tone generator element TGb of the processor device SY2. Let it be assumed here that logical connections between the keyboard element KBa, tone generator element TGb and speaker element SPa has been completed in the order mentioned. Once the connection selection processing is started up in the processor device SY2, a screen B1 shown in FIG. 11 is displayed on the display of the processor device SY2. The screen B1 displays two processing elements, i.e. tone generator element TGb and speaker element SPb, functioning in the processor device SY2, so that the user is allowed to select any one of the displayed two processing elements as the processing element for which connection setting is to be performed. If the tone generator element TGb is selected, as the processing element for which connection setting is to be performed, on the screen B1, another screen B2 shown in FIG. 11 is displayed on the display of the processor device SY2.

The screen B2 displays processing elements that are connectable with the selected processing element, i.e. tone generator element TGb and that are resident on the internal network of FIG. 9, via which the user can select any desired one of the displayed connectable processing elements. Such processing elements resident on the internal network of FIG. 9 and connectable with the selected processing element are detected with reference to the device table and connection table. In this case, the device table has recorded therein the keyboard element KBa, tone generator element TGa, speaker element SPa, tone generator element TBb and speaker element SPb. Because other processing elements are connectable with the input and output of the tone generator element according to the connection table, the screen B2 for selecting one of the processing elements connectable with the input of the tone generator element TGb is first displayed. Because only the keyboard element is connectable with the input of the tone generator element, only such a keyboard element is displayed on the screen B2, but also a title "input connection" is displayed on the screen B2. Once the keyboard element is selected on the screen B2, still another screen B3 shown in FIG. 11 is displayed on the display of the processor device SY2. Although, in principle, a process should be performed for selecting a processing element to be connected to the keyboard element in response to the selection of the keyboard element, screen information for selecting any one of processing elements connectable with the output of the keyboard element is displayed on the screen B3 instead of screen information selecting any one of processing elements connectable with the input of the keyboard element. When any one of the processing elements has been selected and if there is any further processing element connectable with the selected processing element, a screen for the user to select "to be continued" or "output connection" is displayed. If the "to be continued" option has been selected, the user is prompted to select a processing element to be connected further.

If, on the other hand, the "output connection" option has been selected on the screen B3, still another screen B4 shown in FIG. 11 is displayed on the display of the processor device SY2. Processing elements connectable with the output of the tone generator element are displayed on the screen B4 along with a title "output connection". Such processing elements resident on the internal network and connectable with the output of the tone generator element are detected from the internal network with reference to the device table and connection table. With this connection, association for outputting a processed result of a signal, supplied from the keyboard element to the tone generator element, to a speaker element (i.e., keyboard element→tone generator element→speaker element) is automatically set. Because only the processing element resident on the internal network and connectable with the output of the tone generator element is the speaker element, screen information for the user to select the speaker element or select a "to be ended" option for ending the setting without selecting the speaker element is displayed on the screen B4. Once the speaker element is selected on the screen B4, still another screen B5 shown in FIG. 11 is displayed on the display of the processor device SY2. When the speaker element has been selected on the screen B4, screen information for the user to select a "to be ended" option is displayed on the screen B5 along with a title "output connection", because no further processing element is connectable with the output of the speaker element. Once the "to be ended" option is selected on the screen B5, still another screen B7 shown in FIG. 11 is displayed on the display of the processor device SY2. User's selection of the "to be ended" option means that the setting for logically connecting between the keyboard element, tone generator element and speaker element in the order mentioned has been completed. In a case where a plurality of processing elements of a same type exist on the internal network, a connection is set individually for each of the same-type processing elements.

Thus, processor devices where the selected tone generator element is functioning are detected from the internal network with reference to the device table, and then the names of the thus-detected processor devices are displayed on the screen B7 so that the user is allowed to select, as a connection destination, any one of processing elements of the displayed processor device names. Because, in this case, it is detected that the keyboard element logically connectable to the tone generator element TGb is functioning only in the processor device SY1, the screen B7 displays screen information for the user to select the device name SY1. Further, in this case, because the setting of FIG. 10 has already been performed to establish the logical connection between the keyboard element KBa and tone generator element TGb, the name of the device SY1 where the key board element KBa is functioning is displayed with an underline indicating that the logical connection has already been established. Once the device name "SY1" is selected as the keyboard element on the screen B7, processor devices where speaker elements logically connectable to the tone generator element are functioning are detected from the internal network, and the names of the detected processor devices are displayed on still another screen B8 so that the user is allowed to select, as a connection destination, any one of the speaker elements of the detected device names. In this case, because the setting of FIG. 10 has already been performed to establish the logical connection between the tone generator element TGb and the speaker element SPa, the name of the device SY1 where the speaker element SPa is functioning is displayed with an underline indicating that the logical connection has already been established. If the speaker element of the processor device SY2 is selected on the screen B8, it means that the setting has been completed to logically connect the tone generator element TGb to the speaker element SPb as well as the speaker element SPa. If there are a plurality of processor devices where the selected processing element is functioning, screens for causing the user to sequentially select device names are sequentially displayed.

Once the "to be ended" option is selected on the screen B4, still another screen B6 shown in FIG. 11 is displayed on the display of the processor device SY2. User's selection of the "to be ended" option means that the setting for logically connecting the keyboard element and tone generator element in the order mentioned has been completed. In a case where a plurality of processing elements of a same type exist on the internal network, a connection is set individually for each of the same-type processing elements. Thus, processor devices where the selected keyboard element is functioning are detected from the internal network with reference to the device table, and then the names of the detected processor devices are displayed on the screen B6 so that the user is allowed to select any one of the displayed processor device names as a connection destination. Namely, screen information similar to that of the screen B7 is displayed on the screen B6. Because the logical connection between the tone generator element TGb and the speaker element SPa has been established, the name of the processor device SY1 where the speaker element SPa is functioning is displayed with an underline indicating that the logical connection has already been established. Then, once the keyboard element of the processor device SY1 is selected, the established logical connection between the keyboard element KBa and the tone generator element TGb is selected, and the connection selection processing for setting the connections between processing elements is brought to an end.

When the connection selection processing for setting connections between processing elements has been brought to an end, the contents of the established connections are stored into the connection buffer of the processor device SY1 for which the setting has been performed. Then, the connection establishment processing is performed, on the basis of the connection contents recorded in the connection buffer, to establish the logical connections, and information indicative of the established logical connections is recorded into the current buffer.

The above-described connection selection processing for setting connections between processing elements via the setting screens shown in FIGS. 10 and 11 is performed independently in each of the processor devices SY1 and SY2. Whereas the connection selection processing has been described above as performed first in the processor device SY1 and then in the processor device SY2, the connection selection processing may be performed first in the device SY2 and then in the device SY1. In such a case, setting screens different from those of FIGS. 10 and 11 are displayed. In the case where the connection selection processing is performed first in the processor device SY1 and when such processing has been completed, logical connections are immediately established, through the connection establishment processing periodically started in response to timer interrupts, on the basis of the contents of connections recorded on the connection buffer of the processor device SY1. Therefore, the logical connections between the processing elements in the processor device SY1 have already been established when the connection selection processing is to be performed in the processor device SY2. Then, when the connection selection processing has been completed in the processor device SY2, the logical connections based on the connection contents recorded in the connection buffer of the processor device SY2 are immediately established by the connection establishment processing periodically started in response to timer interrupts, as set forth above.

Figures 12, 13:
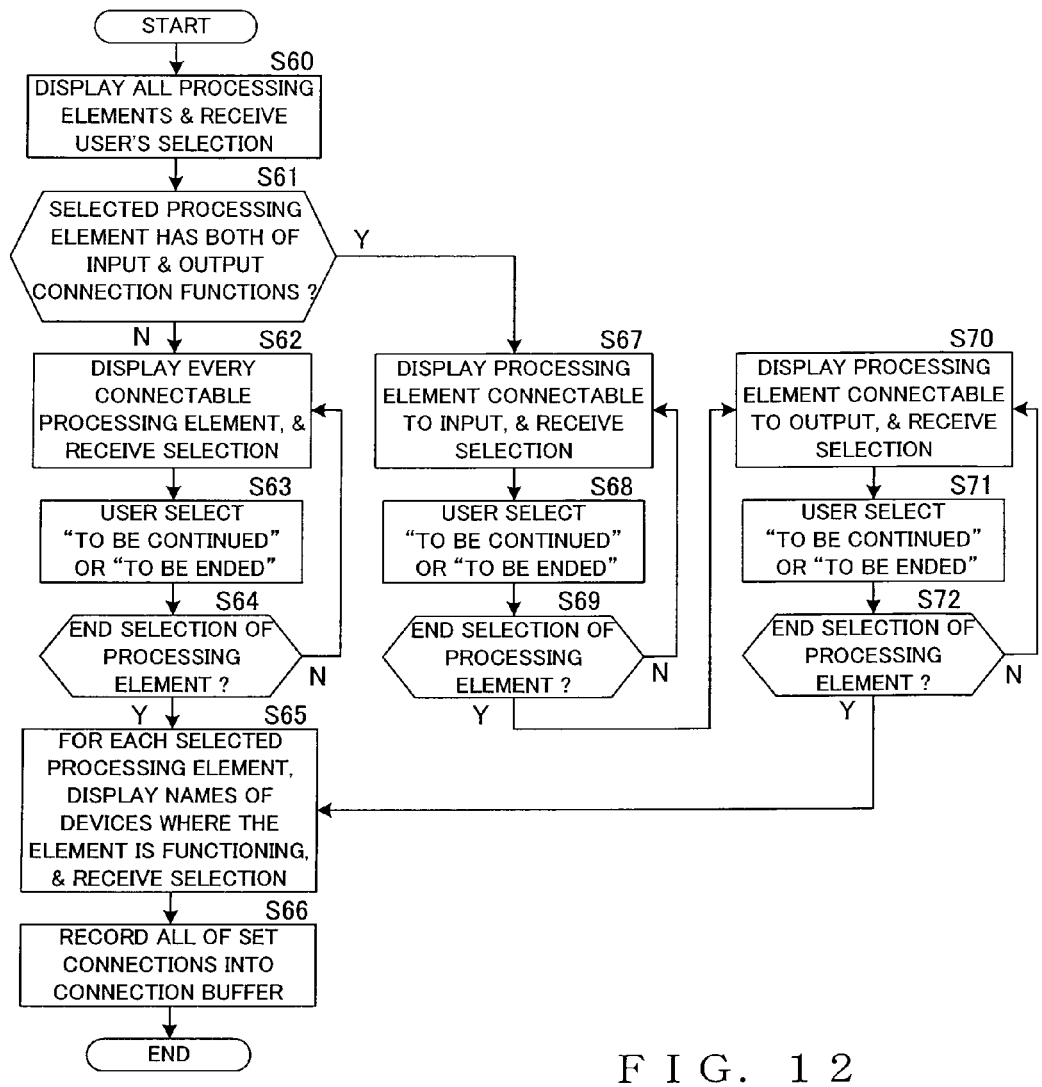
FIG. 12 is a flow chart of connection selection processing performed in setting connections between processing elements in the tone generation system of the present invention.
FIG. 13 is a diagram showing an example of connection information recorded into a connection buffer when the connection selection processing has been performed to effect setting of the logical connections between processing elements.

FIG. 12 is a flow chart of the connection selection processing for setting connections between processing elements via the setting screens of FIGS. 10 and 11.

Once the connection selection processing is started in a given setting device for which connections between processing elements are to be set, all of the processing elements of the given setting device are displayed on a screen, like the screen A1 of FIG. 10 or screen B1 of FIG. 11, and a user's selection of any one of the processing elements is received, at step S60. When any one of the processing elements has been selected, the connection selection processing goes to step S61, where a determination is made, with reference to the connectable table, as to whether the selected processing element has both of input and output functions. If the selected processing element has only one of the input and output connection functions, a NO determination is made at step S61, and the processing goes on to step S62, where every processing element connectable to one of the inputs or outputs is displayed and a screen is displayed for receiving a user's selection of any one of the displayed processing elements. Once any one of the displayed processing elements is selected, the process proceeds to step S63, where, if there is any further processing element connectable to the processing element selected on the screen displayed at step S62, another screen is displayed to allow the user to make a selection as to whether the further processing element is to be connected (i.e., the connection is to be continued) or the connection is to be ended, at step S63. If, on the other hand, there is no further processing element connectable to the processing element selected on the screen displayed at step S62, another screen is displayed for the user to select "to be ended". At next step S64, a determination is made as to whether the "to be ended" option has been selected. If the "to be ended" option has been selected as determined at step S64, the processing goes to step S65, but, if the "to be continued" option has been selected as determined at step S64, the processing reverts to step S62, so that the operations of steps S62 to S64 are performed again to allow the user to perform a selection process on a processing element further connectable to the last selected processing element. The operations of steps S62 to S64 are repeated until no further processing element is detected as connectable to the last selected processing element, or until the "to be ended" option is selected by the user.

If the selected processing element has both of the input and output connections as determined at step S61, then the processing branches to step S67, where every processing element connectable to the input of the selected processing element is displayed and a screen is displayed for receiving a user's selection of any one of the displayed processing elements. Once any one of the displayed processing elements is selected and if there is any processing element connectable to the input of the selected processing element, a screen is displayed to allow the user to make a selection as to whether the connection is to be connected or to be ended, at step S68. If there is no further processing element connectable to the selected processing element, a screen is displayed for the user to select "to be ended". Then, a determination is made, at step S69, as to whether the "to be ended" option has been selected. If the "to be ended" option has been selected as determined at step S69, the processing goes to step S70, but, if the "to be continued" option has been selected as determined at step S69, the processing reverts to step S67, the operations of steps S67 to S69 are performed again to allow the user to perform a selection operation on a processing element further connectable to the input of the last selected processing element. The operations of steps S67 to S69 are repeated until no further processing element is detected as connectable to the input of the last selected processing element, or until the "to be ended" option is selected by the user.

Upon reaching step S70 after selection of the "to be ended" option at step S69, every processing element determined to be connectable to the output of the processing element selected at step S61 is displayed, and a screen is displayed for receiving a user's selection of any one of the displayed processing elements is displayed. Once any one of the displayed processing elements is selected and if there is any processing element connectable to the output of the selected processing element, a screen is displayed to allow the user to make a selection as to whether the connection to be continued or to be ended, at step S71. If there is no further processing element connectable to the selected processing element, a screen is displayed for the user to select "to be ended". Then, a determination is made, at step S72, as to whether or not the "to be ended" option has been selected. If the "to be ended" option has been selected as determined at step S72, the processing goes to step S65, but, if the "to be continued" option has been selected as determined at step S72, the processing reverts to step S70, so that the operations of steps S70 to S72 are performed again to allow the user to perform a selection operation on a processing element further connectable to the output of the last selected processing element. The operations of steps S70 to S72 are repeated until no further processing element is detected as connectable to the output of the last selected processing element, or until the "to be ended" option is selected by the user.

At step 8 following the determination at step S64 or S72 that the "to be ended" option has been selected, an operation is performed, for each selected processing element, for displaying a screen indicating names of processor devices where the selected processing element is functioning and for receiving a user's selection of any one of the displayed processor device names. Once any one of the displayed processor device names is selected, the user selects any one of processing elements functioning in the processor device of the selected device name, so that contents of the thus-set logical connections are stored into the connection buffer. In this case, the successively-selected logical connections are stored into the connection buffer in association with each other, assuming that they will be communicated successively. The "successively-selected logical connections" mean a plurality of logical connections having been set from the time of the start of the connection selection processing to the time of the writing, into the connection buffer, of the set connection contents. After completion of the operation of step S66, the connection selection processing is brought to an end. Then, when the later-described connection establishment processing is performed, on the basis of the connection information stored in the connection buffer, to establish the logical connections, so that information of the established connections (i.e., established connection information) is recorded into the current buffer.

FIG. 13 shows an example of the connection information recorded in the connection buffer when the connection selection processing shown in FIGS. 10 and 11 has been performed to effect the setting of the logical connections of the processing elements.

The connection selection processing of FIG. 10 is performed in the processor device SY1, where a connection of the keyboard element KBa is carried out first followed by setting of connections between the keyboard element KBa, processor device SY2 and tone generator element TGb and where a connection between the tone generator element TGb and speaker element SPa of the processor device SY1 is set. Thus, as indicated as "• case of SY1 tone generator" in FIG. 13, connection information, "output 1→SY2 tone generator→SY1 speaker", is stored into the connection buffer. "Output 1" represents a first output of the keyboard of the device SY1

Further, the connection selection processing shown in FIG. 11 is performed in the processor device SY2, where setting of a connection of the tone generator element TGb is carried out first followed by setting of c connection of the keyboard element KBa of the processor device SY1 to the input of the tone generator element TGb and setting of a connection of the speaker element SPb of the processor device SY2 to the output of the tone generator element TGb. Thus, as indicated as "• case of SY2 tone generator" in FIG. 13, connection information, "input 1←SY1 keyboard" and "output 1→SY2 speaker", is stored into the connection buffer. Here, the reason whey "input 1→output 1" is set is that setting of the input and output sides has been performed in succession in the tone generator element TGb. Connection information, "input 1←SY1 keyboard", "input 1→output 1" and "output 1→SY2 speaker", indicates that MIDI data output from the keyboard of the device SY1 are input to the tone generator element TGb of the device SY2 (input 1) and processed results of the MIDI data from the tone generator element TGb (output 1) are output to (or associated with) the speaker of the device SY2.

Figure 14:
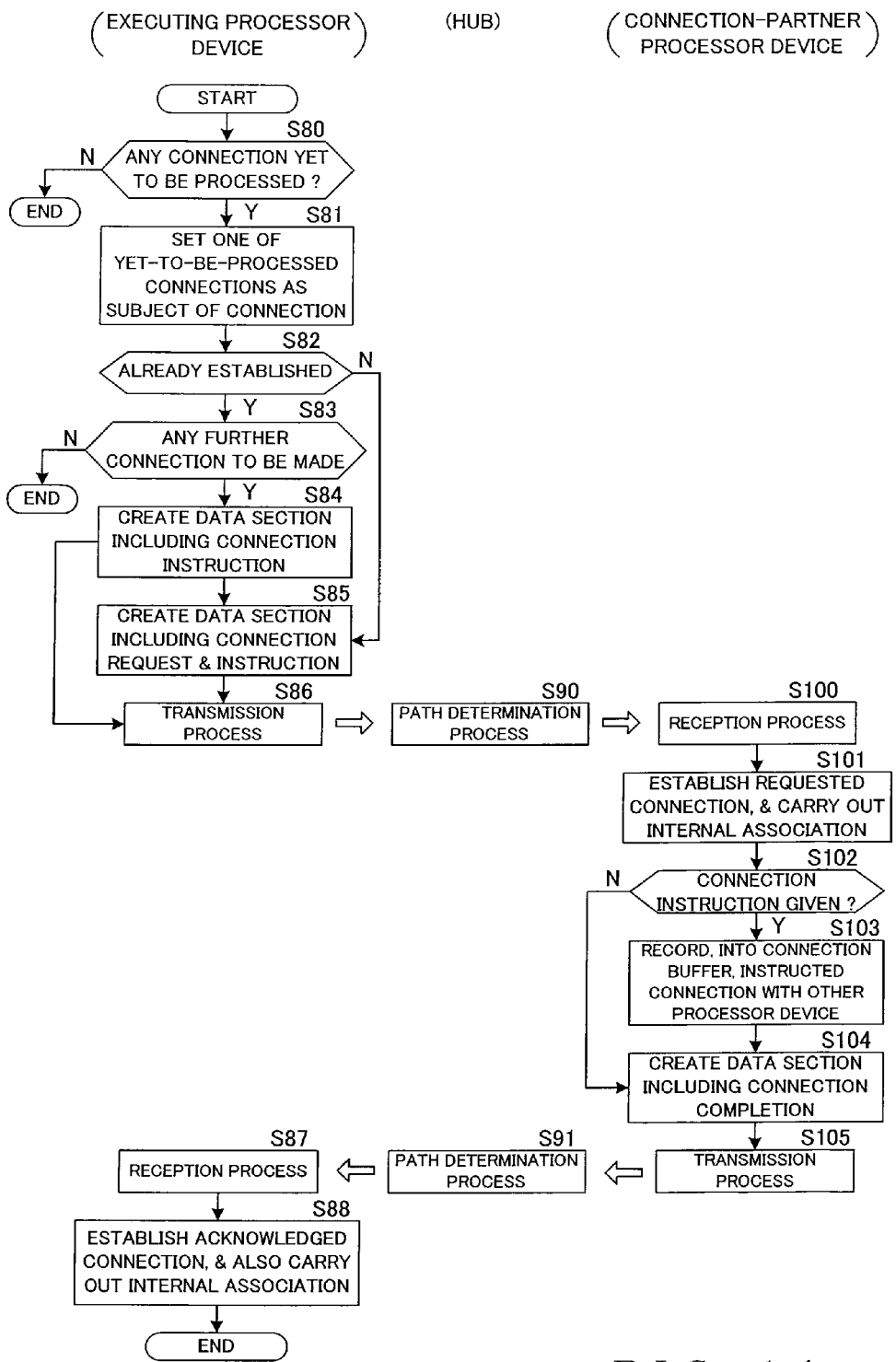
FIG. 14 is a flow chart of connection establishment processing performed following the connection selection processing in the tone generation system of the present invention.

FIG. 14 is a flow chart of the connection establishment processing for establishing logical connections to perform communication of substantive data. The connection establishment processing is started periodically at predetermined time intervals in response to timer interrupts. Control data which a given processor device having started execution of the connection establishment processing (hereinafter also referred to as "executing processor device") should communicate with another processor device are communicated using the IP address of a destination processor device and predetermined port number for the control data.

First, at step S80 of the connection establishment processing, a determination is made, on the basis of recorded contents in the connection buffer, as to whether there is any connection yet to be processed. If there is no connection to be processed as determined at step S80, the connection establishment processing is brought to an end without performing any further operation. If, on the other hand, there are one or more connections yet to be processed as determined at step S80, the processing proceeds to step S81, where one of the connections yet to be processed is set as a subject of connection to be established. Here, "one of the connections" represents a row of data in the connection buffer, and a connection to be established means setting of a port for performing communication of substantive data. At following step S82, a further determination is made, with reference to the current buffer, as to whether the subject of connection has already been established. If the subject of connection has already been established, the processing goes to step S83 without establishing the new connection. At step S83, a determination is made as to whether the subject of connection has any further connection to be made. With a NO determination at step S83, the connection establishment processing is brought to an end without performing any further operation. If, on the other hand, the subject of connection has any further connection to be made as determined at step S83, the connection establishment processing goes to step S84 in order to create a data section including a connection instruction. In this case, if the subject of connection has any internal (i.e., input-to-output)

association within the processor device, information indicative of the internal (i.e., input-to-output) association is included in the connection instruction. The connection instruction is an instruction indicating any further partner to be connected with the connection partner (or communication partner), and where the connection partner has a plurality of further connections successively set therefor, information indicative of all of these further connections is included in the connection instruction.

If no subject of connection is recorded in the current buffer and has been established yet as determined at step S82, the processing branches to step S85 in order to create a data section including a connection request and connection instruction. The connection request is intended to request establishment of a connection between the processor device in question and a connection partner (or communication partner). The connection instruction is an instruction indicating any further partner to be connected with the connection partner, and if the subject of connection has any internal association, information indicative of the internal association is included in the connection instruction. Further, where the connection partner has a plurality of further connections successively set therefor, information indicative of all of these further connections is included in the connection instruction. After the data section has been created at step S84 or S85, a transmission process is performed at step S86 for transmitting the data section. In the transmission process of step S86, the data section created at step S84 or S85 is formed into transmitting data, a MAC frame is formed with the transmitting data ultimately capsulated therein as illustrated in FIG. 2, and the thus-formed MAC frame is then transmitted to the internal network. In this case, the MAC address (physical device ID) of the processor device where the processing element selected as the subject of connection is functioning is set, as a destination MAC address, in the MAC header of the MAC frame.

Because the internal network is a star-type network, the MAC frame transmitted to the internal network is received by one of the hubs, and a path determination process is performed by the hub (step S90). In the path determination process, the hub determines a transmission path, on the basis of the destination MAC address of the received MAC frame, to relay the MAC frame. As a consequence, the MAC frame transmitted from the processor device, where operation for the connection establishment is being performed, is received by the processor device where the processing element as the subject of connection is functioning and which matches the destination MAC address (step S100). The processor having received the MAC frame performs a reception process, in which the IP packet is taken out from the MAC frame, then the TCP segment is taken out from the IP packet, and thence the data section is taken out from the TCP segment. Then, at step S101, the processor device as the connection partner reads the received data section and establishes the requested connection. If any internal (i.e., input-to-output) association instruction is contained, the instructed internal association is also carried out. Then, connection information of the established connection and internal association is recorded into the current buffer. In the connection establishment, the IP address of the processor device where the processing element as the partner of the connection in question is functioning and the logical device ID (port number) of that processing element are acquired with reference to the device table. Because the processing element selected as the connection partner of the processor device in question can be identified from the acquired IP address and port number, the intended connection can be established by setting the IP address and port number. After completion of the operation of step S101, the processing goes to step S102, where a determination is made as to whether the data section includes a connection instruction. With a YES determination at step S102, the instructed connection with another processor device is recorded into the connection buffer of the processor device in question (i.e., executing processor device) at step S103, after which the processing moves on to step S104.

If the data section includes no connection instruction as determined at step S102, the processing branches to step S104, where a data section including data indicative of connection completion is created. Then, a transmission process is performed at step S105 for transmitting the data section. In the transmission process of step S105, the data section created at step S104 is formed into transmitting data, a MAC frame is formed with the transmitting data ultimately capsulated therein as illustrated in FIG. 2, and the thus-formed MAC frame is then transmitted to the internal network. In this case, the MAC address of the executing processor device is set, as a destination MAC address, in the MAC header of the MAC frame. Because the internal network is a star-type network, the MAC frame transmitted from the connection-partner processor device to the internal network is received by one of the hubs, and a path determination process is performed by the hub (step S91). In the path determination process, the hub determines a transmission path, on the basis of the destination MAC address of the received MAC frame, to relay the MAC frame. As a consequence, the MAC frame transmitted from the connection-partner processor device is received by the processor device where the connection establishment processing is being performed and which matches the destination MAC address, and a reception process is performed in the executing processor device (step S87).

In the reception process, the IP packet is taken out from the MAC frame, then the TCP segment is taken out from the IP packet, and thence the data section is taken out from the TCP segment. Then, at step S88, the executing processor device reads the received data section and establishes the connection completion of which has been acknowledged. If any internal (i.e., input-to-output) association instruction is contained, the instructed internal association is also carried out. Then, connection information of the established connection and internal association is recorded into the current buffer. In the connection establishment, the IP address of the processor device where the processing element as the partner of the connection in question is functioning and the logical device ID (port number) of that processing element are acquired with reference to the device table. Because the processing element selected as the connection partner can be identified from the acquired IP address and port number, the intended connection can be established by setting these IP address and port number. The connection establishment processing is brought to an end after completion of the operation of step S88.

Note that the connection based on the connection information recorded in the connection buffer of the connection-partner processor device can be established by the connection-partner processor device being caused to function as an executing processor device to perform the connection establishment processing of FIG. 14.

Figures 15, 16:
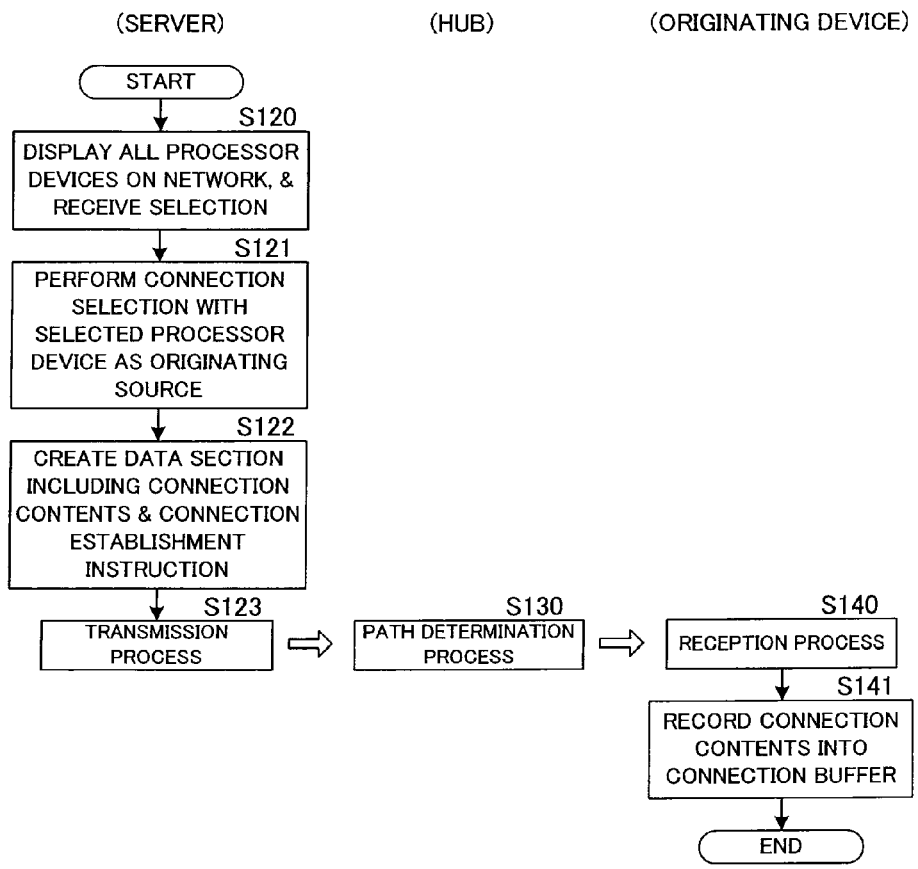
FIG. 15 is a diagram showing examples of connection information and association among processing elements recorded in a current buffer in the tone generation system of the present invention.
FIG. 16 is a flow chart of connection selection processing performed by a SV (server) in the tone generation system of the present invention.

The connection information indicative of the substantive-data-communicating logical connections, established through the execution of the connection establishment processing, and internal (input-to-output) association within the processor device is recorded into the current buffer. FIG. 15 shows examples of the connection information and internal association recorded in the current buffer. In the illustrated example, logical connections currently established in the executing processor device are recorded into the current buffer.

The connection information and internal association shown in FIG. 15 are results obtained by the connection establishment processing being performed on the basis of the connection information recorded in the connection buffer as shown in FIG. 13, and respective connection information of the keyboard element KBa, tone generator element TGa and speaker element SPa functioning in the processor device SY1 and association among them is recorded into the current buffer of the processor device SY1. In this case, the connection information and association of the keyboard element KBa is recorded as "port 1: output→SY2 tone generator", which indicates that MIDI data output from the keyboard element KBa are supplied via port 1 of the processor device SY1 to the processor device SY2. Because the tone generator element TGa is not connected with any other processing element, no connection information and association is recorded for the tone generator element TGa. The connection information and association of the speaker element SPa is recorded as "port 2: input←SY2 tone generator", which indicates that audio data output from the tone generator element TGb of the processor device SY2 are received via port 2 of the processor device SY1 and thereby supplied to the speaker element SPa.

Further, respective connection information of the tone generator element TGb and speaker element SPb functioning in the processor device SY2 and association between them is recorded into the current buffer of the processor device SY2. In this case, the connection information and association of the tone generator element TGb is recorded as "port 1: input←SY1 tone generator", "port 1→port 2", "port 1→port 3", "port 2: output→SY1 speaker" and "port 3: output→SY2 speaker". "port 1: input←SY1 tone generator" is connection information indicating that MIDI data output from the keyboard element KBa of the processor device SY1 are received via port 1 of the processor device SY2 and thereby supplied to the tone generator element TGb. "port 1→port 2" and "port 1→port 3" is connection information indicating that audio data obtained by the tone generator element TGb processing the MIDI data output from the keyboard element KBa of the processor device SY1 are output via port 2 and port 3. "port 2: output→SY1 speaker" and "port 3: output→SY2 speaker" is connection information indicating that audio data obtained by the tone generator element TGb processing the MIDI data input via port 1 are supplied via port 2 to the speaker element SPa of the processor device SY1 and that audio data obtained by the tone generator element TGb processing the MIDI data input via port 1 are supplied via port 3 to speaker element SPb of the processor device SY2. Association of the speaker element SPb with the connection information is recorded as "port 3: input←SY2 tone generator", which indicates that audio data obtained by the tone generator element TGb processing the MIDI data input via port 1 are received via port 3 and thereby supplied to the speaker element SPb.

The above-described connection selection processing can also be performed by the SV (server) 11. FIG. 16 is a flow chart of the connection selection processing performed by the SV (server) 11. Control data to be communicated between the SV (server) 11 and the connection-originating processor device is communicated using the IP address of a destination processor device and port number predetermined for the control data.

Once the connection selection processing is started up in the SV (server) 11, the SV (server) 11 displays, at step S120, all of the processor devices resident on the internal network with reference to the device table, and it receives a selection of the connection-originating processor device. Here, upon detection that the connection-originating processor device has been selected, the SV (server) 11 proceeds to step S121, where it performs connection selection processing with the selected processor device selected as the connection-originating source. Contents of connections of all of the processor devices resident on the internal network, having been set through the connection selection processing, are stored into the SV (server) 11. Then, at step S122, the SV (server) 11 creates a data section that includes connection contents that have been set through the connection selection processing and a connection establishment instruction that instructs the connection-originating processor device to establish the connection contents.

Then, a transmission process is performed at step S123. In the transmission process of step S123, the data section is formed into transmitting data, a MAC frame is formed with the transmitting data ultimately capsulated therein as illustrated in FIG. 2, and the thus-formed MAC frame is then transmitted to the internal network. In this case, the MAC address (physical device ID) of the connection-originating processor device is set, as a destination MAC address, in the MAC header of the MAC frame. Because the internal network is a star-type network, the MAC frame is received by one of the hubs, and a path determination process is performed by the hub (step S130). In the path determination process, the hub determines a transmission path, on the basis of the destination MAC address of the received MAC frame, to relay the MAC frame. As a consequence, the MAC frame transmitted from the SV (server) 11 is received by the processor device which has been selected as the connection-originating source and which matches the destination MAC address, and a reception process is performed in the connection-originating processor device (step S140). In the reception process, the IP packet is taken out from the MAC frame, then the TCP segment is taken out from the IP packet, and thence the data section is taken out from the TCP segment. Then, at step S141, the connection-originating processor device reads the received data section and records the contents of connections, of which establishment has been instructed, into the connection buffer of the connection-originating processor device, after which the connection selection processing is brought to an end.

Note that the connection establishment based on the connection information recorded in the connection buffer of the connection-originating processor device is effected by the connection-partner processor device being caused to function as an executing processor device to perform the connection establishment processing of FIG. 14.

The above-described network connection processing of FIG. 6, network disconnection processing of FIG. 7, connection selection processing of FIGS. 10-12, connection establishment processing of FIG. 14 and connection selection processing of FIG. 16 performed by the SV (server) 11 may be carried out using a browser by the processor devices, performing these processing, activating browser software. The browser can perform file transfer based on HTTP (HyperText Transfer Protocol) and read and display a hyper text described in HTML (Hyper Text Markup Language). In this case, the browser is caused to display necessary setting screens and selecting screens so that the user can make settings and selections on the screens. Further, control data can be communicated using request methods, such as "GET" capable of requesting a file prepared in the HTTP, "POST" for transmitting desired data and "PUT" capable of updating a file.

Although the HTTP protocol generally uses a port number "80", the present invention is not so limited.

The following paragraphs describe various processing elements handled in the tone generation system of the present invention. Here, transmission and reception ports of each processing element are assigned port numbers unique to that processing element. However, because each of the ports of the individual processing elements is identifiable by the IP address and port number, it is not always necessary to assign different or unique port numbers per processing element.

Figure 17:
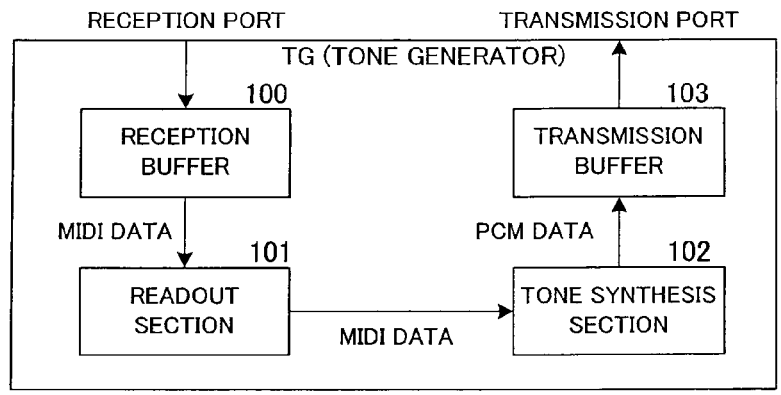
FIG. 17 is a functional block diagram of a tone generator element in the tone generation system of the present invention.

FIG. 17 is a functional block diagram of the tone generator element. As shown, the tone generator element TG includes a reception buffer 100 that receives, from the reception port, MIDI data together with timing data and stores the received data in predetermined processing order, and a readout section 101 that, in accordance with the timing data and timing indicated by an internal MIDI clock, sequentially reads out, from the reception buffer 100, the MIDI data to be processed and then supplies the read-out MIDI data to a tone synthesis section 102. The tone synthesis section 102 determines a tone pitch in accordance with note data of the supplied MIDI data, determines a tone color in accordance with program change data of the MIDI data, determines control amounts, such as a tone volume and effect amount, in accordance with control change data of the MIDI data, and generates a tone in the form of PCM data in accordance with the thus-determined information. The tone generator element TG also includes a transmission buffer 103 that stores the PCM data, generated by the tone synthesis section 102, in generated order (i.e., in the order the data were generated). The reception buffer 100 receives substantive data (MIDI data) from the reception port of the tone generator element, and the transmission buffer 103 transmits substantive data (PCM data) from the transmission port of the tone generator element. Port number of the reception port is identical to the logical device ID of the tone generator element in question recorded in the device table shown in FIG. 3, and the transmission port is assigned a random port number at the time of transmission; however, the transmission port may be assigned a fixed port number. Further, the PCM data to be transmitted via the transmission buffer 103 may be compressed as MP3 data. In the context of the present invention, the PCM data and MP3 data are generically called "audio data".

Figure 18:
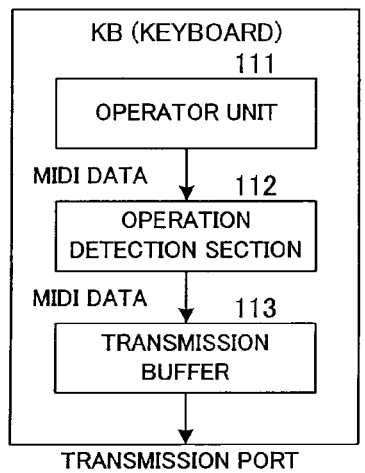
FIG. 18 is a functional block diagram of a keyboard element in the tone generation system of the present invention.

FIG. 18 is a functional block diagram of the keyboard element. As shown, the keyboard element KB includes a hardware operator unit 111, an operation detection section 112 that detects operation on the operator unit 111 to generate timing data of generated MIDI data on the basis of an internal MIDI clock, and a transmission buffer 113 that stores sets of the MIDI data and timing data, supplied from the operation detection section 112, in generated order (i.e., in the order the data were generated). The transmission buffer 113 transmits substantive data in the form of MIDI data from the transmission port of the keyboard element. In the instant embodiment, the transmission port is assigned a random port number at the time of transmission; however, the transmission port may be assigned a fixed port number.

Figure 19:
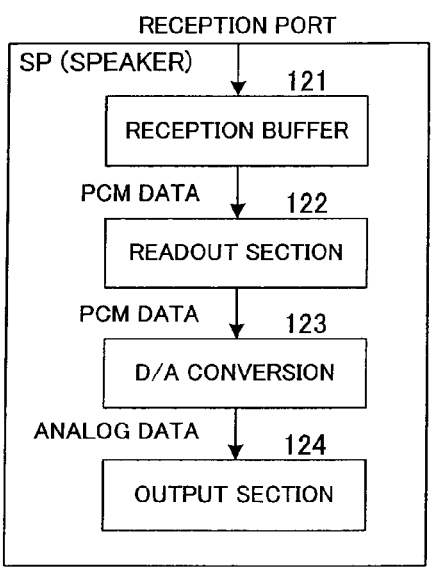
FIG. 19 is a functional block diagram of a speaker element in the tone generation system of the present invention.

FIG. 19 is a functional block diagram of the speaker element. As shown, the speaker element SP includes a reception buffer 121 that stores PCM data received from the reception port, and a readout section 122 that, in accordance with timing of a sampling frequency fs, reads out the PCM data, sample by sample, from the reception buffer 121 and supplies the read-out PCM data to a D/A conversion section 123. The D/A conversion section 123 converts the PCM data, supplied form the readout section 122, into an analog audio signal. The speaker element SP further includes an output section 124 including a speaker that amplifies the audio signal supplied from the D/A conversion section 123. The reception buffer 121 receives the substantive data (PCM data) from the reception port of the speaker element. Port number of the reception port is identical to the logical device ID of the speaker element in question recorded in the device table shown in FIG. 3.

Figure 20:
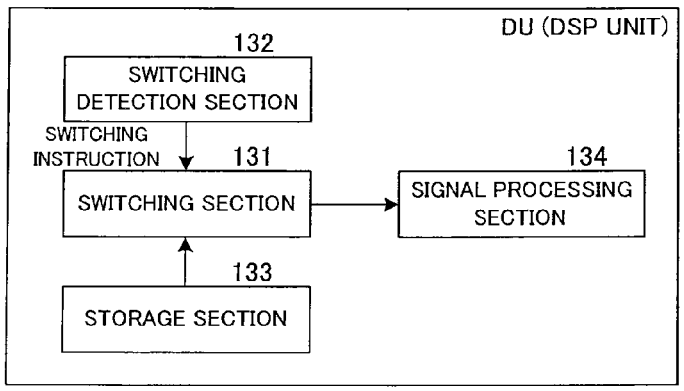
FIG. 20 is a functional block diagram of a DSP unit in the tone generation system of the present invention.

FIG. 20 is a functional block diagram of the DSP unit DU. The DSP unit DU is a processor device and arranged to be capable of switching the processing element functioning therein between a plurality of processing elements. The DSP unit DU includes an internal storage section 133 having stored therein microprograms and parameters of each of the processing elements to be implemented by the DSP, and a switching detection section 132 that detects a switching instruction and instructs a switching section 131 to effect a processing element switching with designation of a processing element to be newly set. The switching section 131 reads out, from the storage section 133, the microprograms and parameters of the processing element designated by the switching instruction and sets the read-out microprograms and parameters into a signal processing section 134. The signal processing section 134 performs signal processing on the basis of the thus-set microprograms and parameters. By the signal processing section 134 performing the signal processing, the DSP unit DU can function as the processing element corresponding to the read-out microprograms. Namely, the DSP unit DU can function as any one of the processing elements having the function blocks as illustrated in FIGS. 17 to 19 and FIGS. 22 to 28. When the processing element has been switched to another one, information of each connection of the previous processing element (i.e., processing element that was functioning before the switching) is deleted from the current buffer, so as to disconnect or cancel each connection of the previous processing element.

Figure 21:
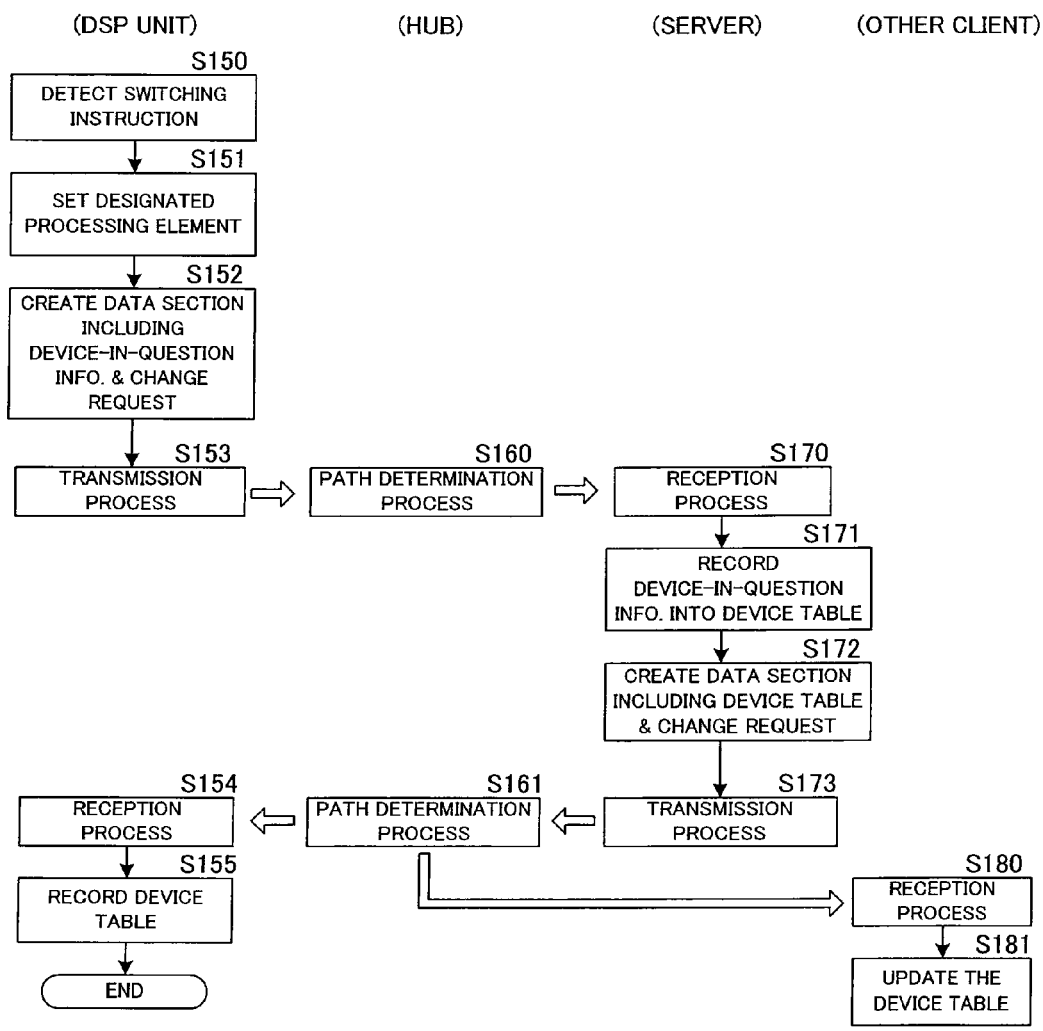
FIG. 21 is a flow chart of informing processing for informing of switching in the DSP unit between processing elements in the tone generation system of the present invention.

FIG. 21 is a flow chart of informing processing for informing of a processing element switch when the processing element functioning in the DSP unit DU has been switched to another processing element.

In switching between the processing elements in the DSP unit DU, each connection of the previous processing element (i.e., processing element that was functioning before the switching) is disconnected. The informing processing is started once the switching instruction is detected (step S150). Then, at step S151, the microprograms and parameters to be newly set in accordance with the switching instruction are set, to allow the other (or newly-selected) processing element to function in the DSP unit DU. Further, a data section including device-in-question information and change request is created at step S152. In this case, the device-in-question information includes information indicative of the logical device ID, IP address (assigned to the device by the DHCP server when the device logged into the internal network), physical device ID and device name of the device, and name and processing ID of the processing element set in the signal processing section 134. The change request is a request that corresponding data of the device table provided in the SV (server) 11 be rewritten with the device-in-question information. Transmission process is performed at step S153. In the transmission process of step S153, the data section created at step S152 is formed into transmitting data, a MAC frame is formed with the transmitting data ultimately capsulated therein as illustrated in FIG. 2, and the thus-formed MAC frame is then transmitted to the internal network. The MAC address (physical device ID) of the SV (server) 11 is set, as a destination MAC address, in the MAC header of the MAC frame.

Because the internal network is a star-type network, the MAC frame transmitted from the DSP unit DU is received by one of the hubs, and a path determination process is performed by the hub (step S161). In the path determination process, the hub determines a transmission path, on the basis of the destination MAC address of the received MAC frame, to relay the MAC frame. As a consequence, the MAC frame transmitted from the DSP unit DU is received by the SV (server) 11 that matches the destination MAC address, and a reception process is performed in the SV (server) 11 (step S170). In the reception process, the IP packet is taken out from the MAC frame, then the TCP segment is taken out from the IP packet, and thence the data section is taken out from the TCP segment. Then, the SV (server) 11 reads the data section and judges, because of the change request present in the data section, that a change process is to be performed. The SV (server) 11 rewrites the device table with the device-in-question information of the DSP unit DU included in the data section at next step S171, and then creates a data section including the changed device table and change request at step S172. The thus-created data section is transmitted to the internal network through a transmission process performed at step S173. This transmission process is similar to the transmission process of step S153, except that an all-one broadcast address (FF-FF-FF-FF-FF-FF) is set as a destination MAC address and a broadcast address is set as a destination IP address as well. If the network address of the internal network address is set at "192. 168. 111. 0" as in the device table of FIG. 3, the broadcast address of the IP address is set to "192. 168. 111. 255".

The MAC frame broadcast by the SV (server) 11 is received by one of the hubs, and the hub performs a path determination process (step S161). The path determination process of step S161 is similar to the path determination process of step S160 above; however, at step S161, the MAC frame is relayed to all of the processor devices because the MAC frame has been assigned the broadcast address. Upon receipt of the broadcast MAC frame, the DSP unit DU performs a reception process on the MAC frame of the broadcast address at step S154 in a similar manner to step S170. Then, at step S155, the device table information taken out from the received MAC frame is stored in the internal storage means of the DSP unit DU so that the device table is updated, after which the network connection processing in the DSP unit is brought to an end. Upon receipt of the broadcast MAC frame, the other client performs a reception process on the MAC frame of the broadcast address at step S180 in a similar manner to step S170. At next step S181, the other client updates the stored device table in accordance with device table information taken out from the received MAC frame, after which the network connection processing in the other client is brought to an end.

Figure 22:
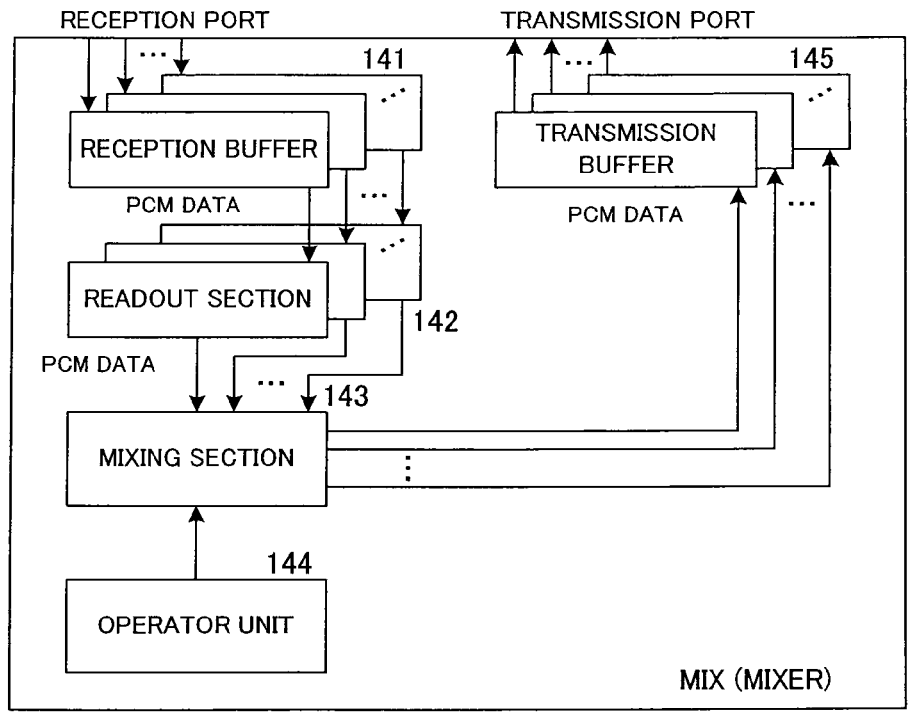
FIG. 22 is a functional block diagram of a mixer element in the tone generation system of the present invention.

FIG. 22 is a functional block diagram of the mixer element. As shown, the mixer element MX includes reception buffers 141 provided, in corresponding relation to receiving channels, for receiving PCM data from reception ports and recording the received PCM data in predetermined processing order, and readout sections 142 provided, in corresponding relation to receiving channels, for, in accordance with timing of a sampling frequency fs, reading out the PCM data, sample by sample, from the reception buffers 141 and supplies the read-out PCM data to a mixing section 143. The mixing section 143 mixes (signal-processes) the PCM data, input from the reception buffers 141, in accordance with settings of various parameters input via an operator unit 144. The mixer element MX further includes transmission buffers 145 provided, in corresponding relation to transmitting channels, for recording the PCM data, output from the mixing section 143, in generated order. The reception buffers 141 receive substantive data (PCM data) from the reception ports of the mixer element, and the transmission buffers 145 transmit substantive data (PCM data) via the transmission ports of the mixer element. The reception ports are assigned channel-specific different port numbers, and the transmission ports too are assigned channel-specific different port numbers.

Figure 23:
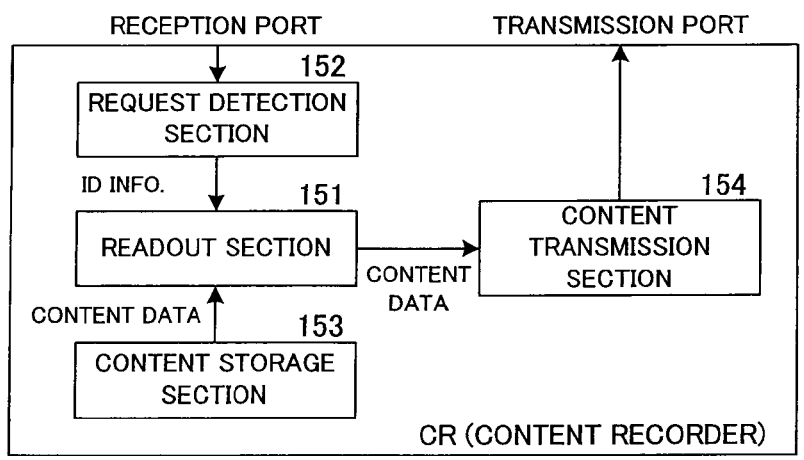
FIG. 23 is a functional block diagram of a content recorder element in the tone generation system of the present invention.

FIG. 23 is a functional block diagram of the content recorder element. Data to be communicated by the content recorder element CR are control data rather than substantive data, and a control data port rather than a substantive data port is used in communication between the content recorder element and another processing element. In this case, the processing element (processor device) requesting the content may be caused to display a screen necessary for acquisition of content so that the user can select, on the screen, desired content. Communication of the control data can be performed using a "GET" request method included in the HTTP protocol to request a file.

The processing element (processor device) requesting the content of the content recorder element CR transmits control data after putting a content request and content data identification information in the data section of the control data. Here, the content is a file to be processed in a particular processing element, such as a file of a song, style and voice. The content recorder element CR includes a request detection section 152 that detects (receives) a content request input via the reception port and supplies a readout section 151 with the content request and content data identification information, and the readout section 151 reads out, from a content storage section 153, the content data corresponding to the identification information and passes the read-out content data to a content transmission section 154. The content storage section 153 has stored therein a plurality of content data along with respective identification information, and the content transmission section 154 transmits the read-out content data via the transmission port. Port number of the reception port is identical to the port number assigned in advance to the control data (generally, in the case of the HTTP protocol, a port number "80" is assigned although the present invention is not so limited), and the transmission port is assigned a random port number at the time of transmission; however, the transmission port may be assigned a fixed port number.

Figure 24:
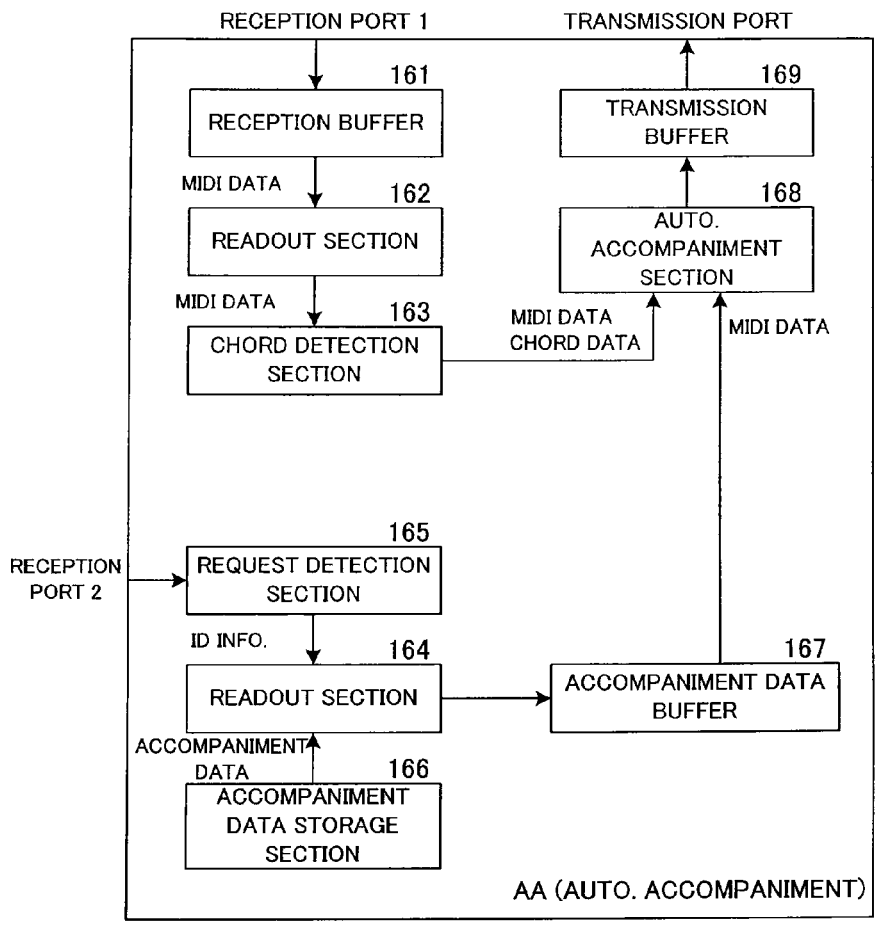
FIG. 24 is a functional block diagram of an automatic accompaniment element in the tone generation system of the present invention.

FIG. 24 is a functional block diagram of the automatic accompaniment element. The automatic accompaniment element AA is arranged to, in accordance with an accompaniment data request from another processing element, edit designated accompaniment data on the basis of performance data and transmits the edited accompaniment data to the other processing element. The automatic accompaniment request data is communicated using a control-data communicating port rather than a substantive-data communicating port. In this case, the processor device, where the accompaniment-data requesting processing element is functioning, may be caused to display a screen necessary for requesting of an automatic accompaniment so that the user can select, on the screen, an automatic accompaniment and transmission destination of the accompaniment data. The communication for the accompaniment data request and acquisition may be performed using the HTTP protocol.

The automatic accompaniment element AA includes: a reception buffer 161 that receives MIDI data (performance data) from the reception port; a readout section 162 that, in accordance with timing of an internal MIDI clock of the automatic accompaniment element AA, reads out, from the reception buffer 161, the MIDI data (performance data) to be processed; and a chord detection section 163 that detects a chord in the MIDI data (performance data) on the basis of note-on and note-off event data included in the MIDI data (performance data).

The processing element (processor device), requesting the automatic accompaniment of the automatic accompaniment element AA, transmits control data after putting an accompaniment data request and accompaniment data identification information in the data section of the control data. The automatic accompaniment element AA also includes a request detection section 165 that, when the accompaniment data request has been detected (received) from "reception port 2", passes, to a readout section 164, the received accompaniment data request and automatic accompaniment identification information. The readout section 164 reads out, from an accompaniment data storage section 166 having stored therein a plurality of sets of accompaniment data, a set of accompaniment data corresponding to the identification information and passes the read-out accompaniment data to an accompaniment data buffer 167. The accompaniment data buffer 167 in turn records the accompaniment data read out from the accompaniment data storage section 166. Note that the accompaniment data set are in the form of a file having accompaniment-reproducing MIDI data recorded therein in predetermined processing order.

The chord detection section 163 passes the detected chord data and supplied MIDI data (performance data) to an automatic accompaniment section 168, and the accompaniment data buffer 167 passes the MIDI data (accompaniment data) to the automatic accompaniment section 168. The automatic accompaniment section 168 sequentially reads out, in accordance with the timing of the internal MIDI clock of the automatic accompaniment element AA, the to-be-processed MIDI data (accompaniment data) from the accompaniment data buffer 167. If the read-out MIDI data (accompaniment data) is note-on event data, the note number is modified in accordance with the current chord data passed from the chord detection section 163, and then the modified or read-out accompaniment data and the MIDI data (performance data) received from the chord detection section 163 are passed to a transmission buffer 169 along with timing data indicative of processing timing of the individual data. The transmission buffer 169 records therein the MIDI data and timing data, supplied from the automatic accompaniment section 168, in predetermined processing order and transmits the MIDI data and timing data, via the transmission port, to the processing element identified by the destination IP address and port number included in the accompaniment data request. The port number of "reception port 1" is identical to the logical device ID of the automatic accompaniment element AA in question recorded in the device table shown in FIG. 3, and the port number of "reception port 2" is identical to the port number assigned in advance to the control data (generally, in the case of the HTTP protocol, a port number "80" is assigned although the present invention is not so limited), and the transmission port is assigned a random port number at the time of transmission; however, the transmission port may be assigned a fixed port number.

Figure 25:
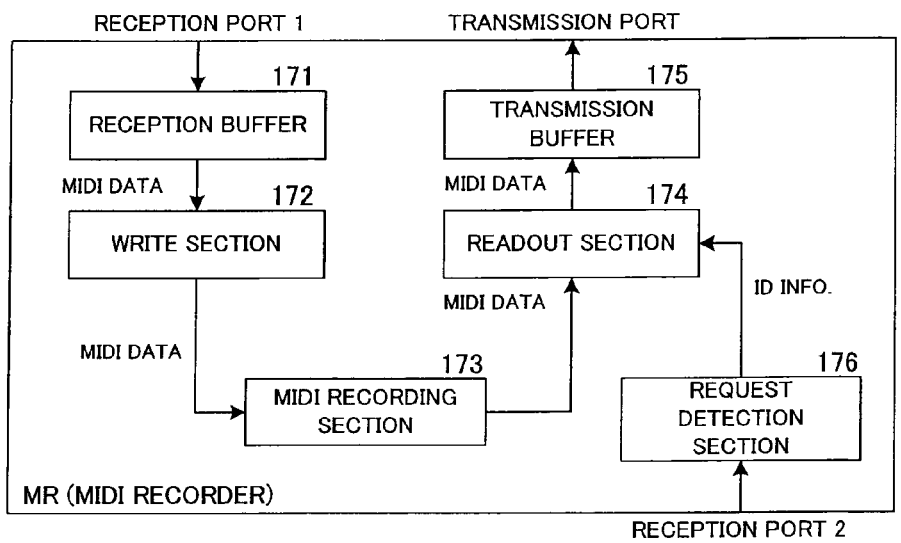
FIG. 25 is a functional block diagram of a MIDI recorder element in the tone generation system of the present invention.

FIG. 25 is a functional block diagram of the MIDI recorder element. The MIDI recorder element MR is arranged to record therein received MIDI data and transmit the recorded MIDI data to a destination processing element (processor device) in response to a readout request.

The MIDI recorder element MR includes a reception buffer 171 that receives MIDI data from "reception port 1" and records therein the received MIDI data in predetermined processing order, and a write section 172 that reads out the MIDI data from the reception buffer 171 and writes sets of MIDI event data and timing data, indicative of processing timing of the MIDI event data, into a MIDI recording section 173 in predetermined processing order. Further, the processing element (processor device), requesting the MIDI data (performance data) of the MIDI recorder element MR, transmits control data after putting a readout request and MIDI file identification information in the data section of the control data. In this case, the processor device, where the readout requesting processing element is functioning, may be caused to display a screen necessary for the readout request so that the user can select, on the screen, a MIDI file and transmission destination of the MIDI file. The communication for the readout request and acquisition may be performed using the HTTP protocol.

The MIDI recorder element MR also includes a request detection section 176 that, when the readout request has been detected (received) from "reception port 2", passes, to a readout section 174, the received readout request and MIDI file identification information. The readout section 174 reads out, in accordance with timing of an internal MIDI clock of the MIDI recorder element MR, the to-be-processed MIDI data from the MIDI recording section 173 and supplies the read-out MIDI data to a transmission buffer 175 that in turn records therein the supplied MIDI data and timing data in predetermined processing order. The transmission buffer 175 transmits the recorded MIDI data and timing data, via the transmission port, to the processing element identified by the destination IP address and port number included in the readout request. The port number of "reception port 1", which is a reception port of substantive data (MIDI data), is identical to the logical device ID of the MIDI recorder element MR in question recorded in the device table shown in FIG. 3, and the port number of "reception port 2" is identical to the port number assigned in advance to the control data (generally, in the case of the HTTP protocol, a port number "80" is assigned although the present invention is not so limited), and the transmission port, which is a transmission port of substantive data (MIDI data), is assigned a random port number at the time of transmission; however, the transmission port may be assigned a fixed port number.

Figure 26:
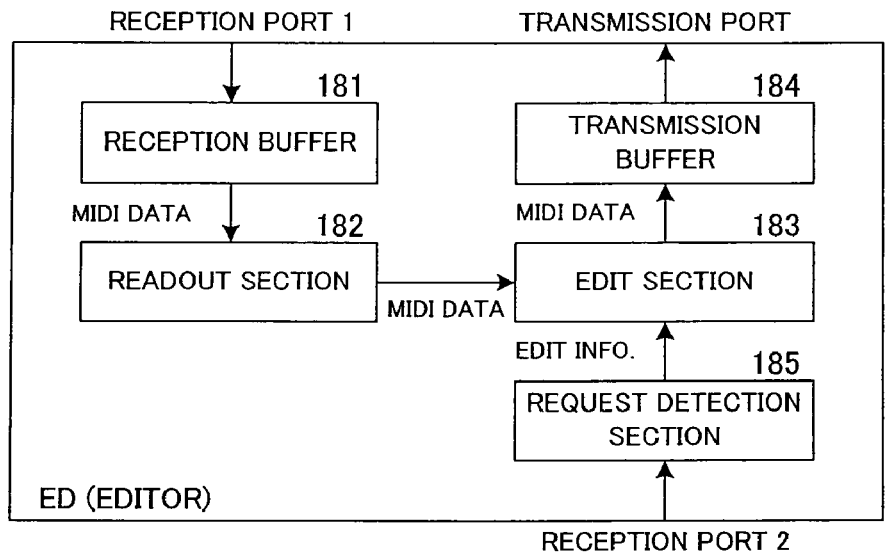
FIG. 26 is a functional block diagram of an editor element in the tone generation system of the present invention.

FIG. 26 is a functional block diagram of the editor element. The editor element ED is arranged to edit received MIDI data in accordance with a setting request and transmit the edited MIDI data to a destination processing element (processor device) in response to the setting request.

The editor element ED includes a reception buffer 181 that receives MIDI data from "reception port 1" and records therein the received MIDI data in predetermined processing order, and a readout section 182 that reads out the to-be-processed MIDI data from the reception buffer 181 in accordance with timing of an internal MIDI clock of the editor element ED and passes the read-out MIDI event data to an editing section 183. Processing element, requesting the editor element ED to perform edit setting, transmits control data after putting the setting request and edit information in the data section of the control data. In this case, the processor device, where the setting requesting processing element is functioning, may be caused to display a screen necessary for the setting request so that the user can set, on the screen, contents of editing to be performed. The communication for the setting request may be performed using the HTTP protocol. The "edit information" is information indicative of contents of editing to be made.

The editor element ED also includes a request detection section 185 that, when the setting request has been detected (received) from "reception port 2", passes the received setting request and edit information to the editing section 183. The editing section 183 performs editing on the MIDI data, passed from the readout section 182, on the basis of the edit information passed from the request detection section 185 and then delivers the thus-edited MIDI data to a transmission buffer 184. The transmission buffer 184 records therein the edited MIDI data, passed from the editing section 183, and timing data in predetermined processing order. In the case of automatic composition, the editing section 183 creates, from the read-out MIDI data (phrase), MIDI data representative of a single music piece on the basis of the edit information and then passes the thus-created MIDI data to the transmission buffer 184. In the case of automatic arrangement, the editing section 183 arranges the read-out MIDI data (melody) on the basis of the edit information to create MIDI data representative of an orchestra music piece and then passes the thus-created MIDI data to the transmission buffer 184. The transmission buffer 184 transmits the recorded MIDI data and timing data, via the transmission port, to the processing element identified by the destination IP address and port number included in the setting request. The port number of "reception port 1", which is a reception port of substantive data (MIDI data), is identical to the logical device ID of the editor element ED in question recorded in the device table shown in FIG. 3, and the port number of "reception port 2" is identical to the port number assigned in advance to the control data (generally, in the case of the HTTP protocol, a port number "80" is assigned although the present invention is not so limited), and the transmission port, which is a transmission port of substantive data (MIDI data), is assigned a random port number at the time of transmission; however, the transmission port may be assigned a fixed port number.

Figure 27:
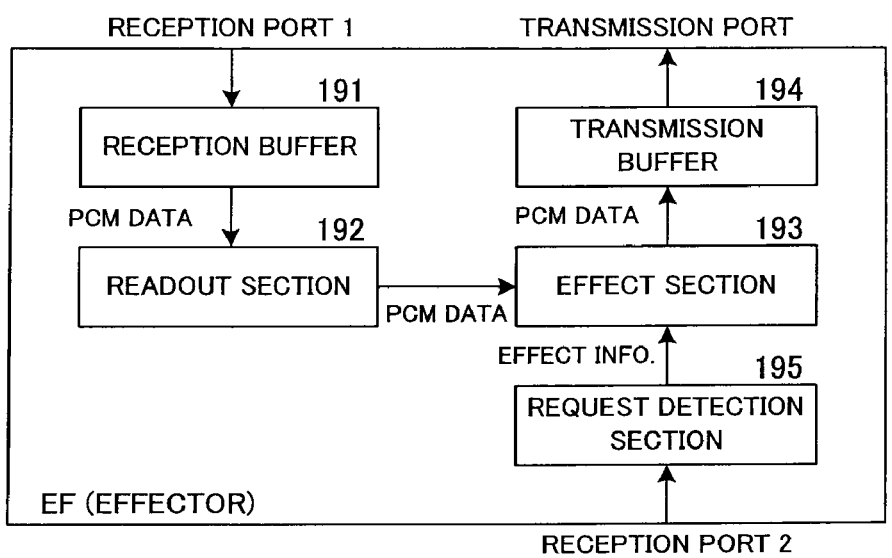
FIG. 27 is a functional block diagram of an effector element in the tone generation system of the present invention.

FIG. 27 is a functional block diagram of the effector element. The effector element EF is arranged to impart an effect to received PCM data and then transmits the effect-imparted PCM data to a destination processing element (processor device) in response to the setting request.

The effector element EF includes a reception buffer 191 provided, for each not-shown receiving channel (input channel), for receiving PCM data from "reception port 1" and recording the received PCM data in predetermined processing order, and a readout section 192 for, in accordance with timing of a sampling frequency fs, reading out the PCM data, sample by sample, from the reception buffers 191 and supplies the read-out PCM data to an effect section 193. The effector element EF transmits control data after putting the setting request and effect information in the data section of the control data. In this case, the processor device, where the setting requesting processing element is functioning, may be caused to display a screen necessary for the setting request so that the user can set, on the screen, contents of an effect to be imparted. The communication for the setting request may be performed using the HTTP protocol. The "effect information" is information indicative of the contents of the effect to be imparted or set.

The effector element EF also includes a request detection section 195 that, when the setting request has been detected (received) from "reception port 2", passes the received setting request and effect information to the effect section 193. The effect section 193 imparts an effect to the PCM data read out by the readout section 192 to create new (i.e., effect-imparted) PCM data and passes the created PCM data to a not-shown transmission buffer 194 provided for each transmitting channel. Effect to be imparted by the effect section 193 is set (determined) on the basis of the effect information, so that a desired effect, such as reverberation or chorus, is imparted to the PCM data. The transmission buffer 194 transmits the recorded PCM data, via the transmission port, to the processing element identified by the destination IP address and port number included in the setting request. The port number of "reception port 1", which is a reception port of substantive data (PCM data), is identical to the logical device ID of the effector element EF in question recorded in the device table shown in FIG. 3, and the port number of "reception port 2" is identical to the port number assigned in advance to the control data (generally, in the case of the HTTP protocol, a port number "80" is assigned although the present invention is not so limited), and the transmission port, which is a transmission port of substantive data (PCM data), is assigned a random port number at the time of transmission; however, the transmission port may be assigned a fixed port number.

Figure 28:
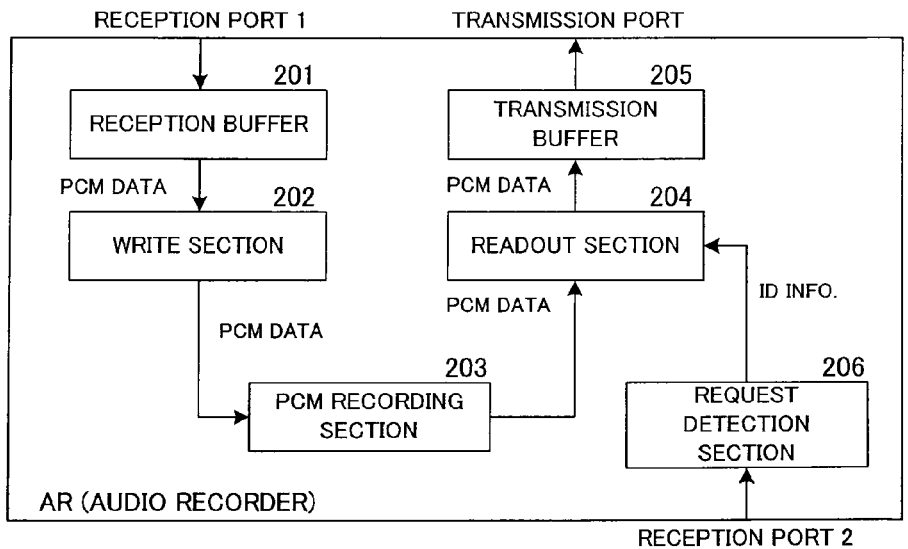
FIG. 28 is a functional block diagram of an audio recorder element in the tone generation system of the present invention.

FIG. 28 is a functional block diagram of the audio recorder element. The audio recorder element AR is arranged to record therein received PCM data and transmit the recorded PCM data to a destination processing element (processor device) in response to a readout request.

The audio recorder element AR includes a reception buffer 201 that receives PCM data from "reception port 1" and records therein the received PCM data in predetermined processing order, and a write section 203 that reads out the PCM data from the reception buffer 201 and writes the read-out PCM data, as a PCM file, into a PCM recording section 203. Further, the processing element (processor device), requesting the PCM data of the audio recorder element AR, transmits control data after putting the readout request and PCM file identification information in the data section of the control data. In this case, the processor device, where the readout requesting processing element is functioning, may be caused to display a screen necessary for the readout request so that the user can select, on the screen, a PCM file and transmission destination of the PCM file. The communication for the readout request and PCM data acquisition may be performed using the HTTP protocol.

The audio recorder element AR also includes a request detection section 206 that, when the readout request has been detected (received) from "reception port 2", passes, to a readout section 204, the received readout request and PCM file identification information. The readout section 204 reads out, from the PCM recording section 203 and in accordance with timing of a sampling frequency fs, the PCM data corresponding to the identification information and supplies the read-out PCM data to a transmission buffer 205 that in turn records therein the supplied PCM data in predetermined processing order. The transmission buffer 205 transmits the recorded PCM data, via the transmission port, to the processing element identified by the destination IP address and port number included in the readout request. The port number of "reception port 1", which is a reception port of substantive data (PCM data), is identical to the logical device ID of the audio recorder element AR in question recorded in the device table shown in FIG. 3, and the port number of "reception port 2" is identical to the port number assigned in advance to the control data (generally, in the case of the HTTP protocol, a port number "80" is assigned although the present invention is not so limited), and the transmission port, which is a transmission port of substantive data (PCM data), is assigned a random port number at the time of transmission; however, the transmission port may be assigned a fixed port number.

Figure 29:
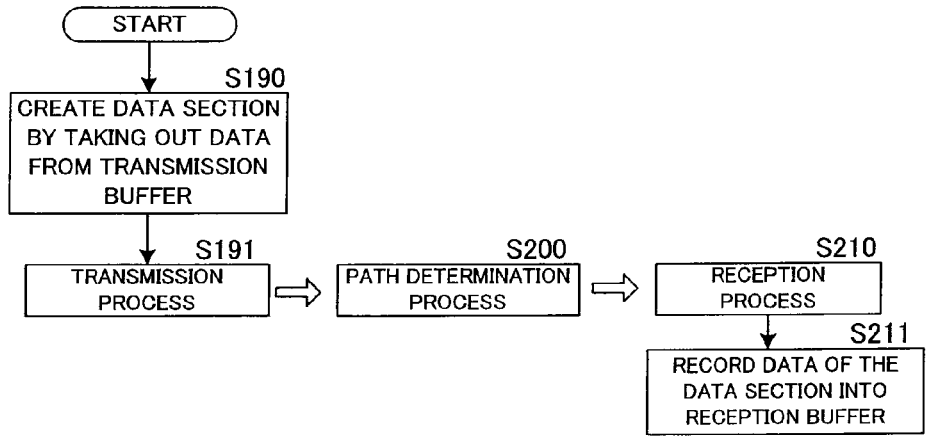
FIG. 29 is a flow chart of communication processing performed to communicate substantive data in the tone generation system of the present invention.

FIG. 29 is a flow chart of communication processing performed to communicate substantive data.

To communicate substantive data, the communication processing is started up in a processor device from which the substantive data are to be transmitted, and logical lines based on the TCP protocol are established between the transmitting and receiving processor devices through handshaking therebetween. At step S190, a data section is created by data being read out from the transmission buffer. Then, a transmission process is performed at step S191, where the data section created at step S190 is formed into transmitting data, a MAC frame is formed with the transmitting data ultimately capsulated therein as illustrated in FIG. 2 and the thus-formed MAC frame is then transmitted to the internal network. The MAC address (physical device ID) of the receiving (i.e., destination) processor device is set, as a destination MAC address, in the MAC header of the MAC frame.

Because the internal network is a star-type network, the transmitted MAC frame is received by one of the hubs, and a path determination process is performed by the hub (step S200). In the path determination process, the hub determines a transmission path, on the basis of the destination MAC address of the received MAC frame, to relay the MAC frame. As a consequence, the MAC frame transmitted from the transmitted processing element is received by the processor device matching the destination MAC address (step S210). In the reception process, the IP packet is acquired from the MAC frame, then the TCP segment is taken out from the IP packet, and thence the data section is acquired from the TCP segment. The data section acquired at step S211 is recorded into the reception buffer of the receiving processor device; communication of the data section is performed using ports established for transmission of the substantive data and recorded in the current buffer.

Whereas the preferred embodiment of the present invention has been described above in relation to the case where the internal network is in the form of an Ethernet LAN, the present invention is not so limited, and the internal network may be in the form of any other suitable network medium. Further, the communication protocol for use in the present invention may be other than the TCP protocol. For example, in cases where a more importance is put on realtimeness, there may be used UDP (User Datagram Protocol) that permits higher transmission speeds although it is less reliable, or TCP/IP may be replaced with IPX/SPX (Internetwork Packet Exchange/Sequence Packet Exchange).

Further, the edit information of the editor element and the effect information of the effector element may be transmitted from another processing element after having been set in the other processing element. In this way, the editor element and effector element can be manipulated from a room where the speaker element is located; thus, the editor element and effector element can be manipulated as if these elements were located in the same room as the speaker element, which can achieve enhanced operability.

Furthermore, the timing for disconnecting between a plurality of processing elements in a given processor device is not limited to the time when the given processor device is connected to the network, and the disconnection may be permitted at any desired timing after the connection, to the network, of the given processor device. In such a case, arrangements may be made such that a process for checking when a disconnection instruction has been given is periodically performed periodically, after the connection to the network, so that the connection between the processing elements in the processor device can be canceled when a disconnection instruction has been detected. Such a disconnection instruction may be given via a particular disconnection-instructing switch. Further, such a disconnection instruction may be given from another processor device resident on the network than the processor device in question.

What is claimed is:
1. A tone generation system composed of a server and a plurality of processor devices connected to a star-type network, said tone generation system comprising:
said plurality of processor devices that function as tone-generation-related processing elements corresponding to respective programs executed in the processor devices; and
said server that manages unique identification information, in the network, set for individual ones of the processing elements functioning in said plurality of processor devices,
wherein, between said server and any one of said processor devices or between said processor devices, communication is carried out on the network using the unique identification information, and
wherein, when a connection is to be made between given processing elements on the network, not only a connection between a connection-originating processing element and a connection-partner processing element of the given processing elements is established, in a first processor device functioning as the connection-originating processing element, in accordance with a setting for connecting between the connection-originating processing element and the connection-partner processing element, but also a connection instruction for connecting between the connection-partner processing element and another processing element is sent to a second processor device, functioning as the connection-partner processing element, to thereby establish a connection between the connection-partner processing element and the other processing element in accordance with a setting for connecting between the connection-partner processing element and the other processing element.

2. A tone generation system as claimed in claim 1 wherein, when the connection is to be made between the given processing elements on the network, connection information indicative of the setting for connecting between the connection-originating processing element and the connection-partner processing element of the given processing elements and connection information indicative of the setting for connecting between the connection-partner processing element and the other processing element is recorded into a connection buffer, and
the connection between the connection-originating processing element and the connection-partner processing element is established in said first processor device on the basis of the connection information recorded in the connection buffer, and a connection instruction for connecting between the connection-partner processing element and the other processing element is sent to said second processor device to thereby establish the connection between the connection-partner processing element and the other processing element on the basis of the connection information recorded in the connection buffer.

3. A network processing method for use in a tone generation system composed of a server and a plurality of processor devices connected to a star-type network, said tone generation system including: the plurality of processor devices that function as tone-generation-related processing elements corresponding to respective programs executed in the processor devices; and the server that manages unique identification information, in the network, set for individual ones of the processing elements functioning in the plurality of processor devices, said network processing method comprising:

a step of, between said server and any one of said processor devices or between said processor devices, carrying out communication on the network using the unique identification information;

a step of, when a connection is to be made between given processing elements on the network, establishing a connection between a connection-originating processing element and a connection-partner processing element of the given processing elements, in a first processor device functioning as the connection-originating processing element, in accordance with a setting for connecting between the connection-originating processing element and the connection-partner processing element; and a step of sending a connection instruction for connecting between the connection-partner processing element and another processing element to a second processor device, functioning as the connection-partner processing element, to thereby establish a connection between the connection-partner processing element and the other processing element in accordance with a setting for connecting between the connection-partner processing element and the other processing element.

* * * * *